(12) United States Patent
Wu et al.

(10) Patent No.: US 12,422,961 B2
(45) Date of Patent: Sep. 23, 2025

(54) TOUCH STRUCTURE, TOUCH DISPLAY PANEL AND ELECTRONIC DEVICE

(71) Applicants: CHENGDU BOE OPTOELECTRONICS TECHOLOGY CO., LTD., Sichuan (CN); BOE TECHNOLOGY GROUP CO., LTD., Beijing (CN)

(72) Inventors: Zhangmin Wu, Beijing (CN); Changshuai Fang, Beijing (CN); Chienpang Huang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/031,145

(22) PCT Filed: May 31, 2022

(86) PCT No.: PCT/CN2022/096280
§ 371 (c)(1),
(2) Date: Apr. 10, 2023

(87) PCT Pub. No.: WO2023/230853
PCT Pub. Date: Dec. 7, 2023

(65) Prior Publication Data
US 2024/0370125 A1 Nov. 7, 2024

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01)

(58) Field of Classification Search
CPC ............................................. G06F 3/041–0448
See application file for complete search history.

(56) References Cited

U.S. PATENT DOCUMENTS

| 11,907,468 B2 * | 2/2024 | Kuo | G06F 3/0443 |
| 2015/0145821 A1 * | 5/2015 | Kim | G06F 3/0412 345/174 |

(Continued)

FOREIGN PATENT DOCUMENTS

| CN | 104808860 B | 9/2018 |
| CN | 109448555 A | 3/2019 |

(Continued)

*Primary Examiner* — David Tung
(74) *Attorney, Agent, or Firm* — Nath, Goldberg & Meyer; Joshua B. Goldberg

(57) ABSTRACT

A touch structure, a touch display panel and an electronic device are provided. The touch structure includes a substrate, is divided into a touch region and a lower frame region connected to the touch region; the touch region includes a touch electrode array and touch traces, the touch electrode array is on the substrate and includes touch electrodes arranged in rows and columns, the touch traces are electrically connected to the touch electrodes; and touch leads in the lower frame region, the touch leads are electrically connected to the touch traces; orthographic projections of every two adjacent touch traces on the substrate do not overlap with each other, a distance between the orthographic projections of every two adjacent touch traces on the substrate at a first position away from the lower frame region is larger than or equal to that at a second position close to the lower frame region.

19 Claims, 19 Drawing Sheets

(56) References Cited

U.S. PATENT DOCUMENTS

| | | | | |
|---|---|---|---|---|
| 2016/0357337 A1* | 12/2016 | Li | ................... | G02F 1/13338 |
| 2016/0378240 A1* | 12/2016 | Li | ................... | G06F 3/04164 |
| | | | | 345/174 |
| 2017/0097713 A1* | 4/2017 | Jin | ................... | G02F 1/1339 |
| 2017/0220192 A1* | 8/2017 | Hu | ................... | G06F 3/04164 |
| 2017/0371471 A1* | 12/2017 | Kim | ................... | G02F 1/1343 |
| 2019/0004645 A1* | 1/2019 | Wang | ................... | G06F 3/041 |
| 2021/0200386 A1* | 7/2021 | Park | ................... | G06F 3/04164 |
| 2021/0278920 A1* | 9/2021 | Tang | ................... | H10K 59/126 |
| 2022/0197417 A1* | 6/2022 | Ye | ................... | G06F 3/04164 |

FOREIGN PATENT DOCUMENTS

| | | | |
|---|---|---|---|
| CN | 113064514 | A | 7/2021 |
| CN | 113268176 | A | 8/2021 |
| CN | 113296624 | A | 8/2021 |
| CN | 113325970 | A | 8/2021 |
| CN | 113424325 | A | 9/2021 |
| EP | 4099141 | A1 | 12/2022 |
| WO | 2021147175 | A1 | 7/2021 |
| WO | 2021164359 | A1 | 8/2021 |
| WO | 2021190345 | A1 | 9/2021 |
| WO | 2022089071 | A1 | 5/2022 |

\* cited by examiner

TOUCH STRUCTURE, TOUCH DISPLAY PANEL AND ELECTRONIC DEVICE

This is a National Phase Application filed under 35 U.S.C. 371 as a national stage of PCT/CN2022/096280, filed May 31, 2022, the content of which is hereby incorporated by reference in its entirety.

TECHNICAL FIELD

The present disclosure relates to the field of display technology, and in particular to a touch structure, a touch display panel and an electronic device.

BACKGROUND

The OLED-based on-cell touch technology generally includes mutual-capacitance mode and a self-capacitance mode. Currently, the wearable small-size devices mainly use a touch technology in the self-capacitance mode, and the medium-size and large-size devices (such as a mobile phone, a foldable device, a pad, an NB) generally use a touch technology in the mutual-capacitance mode. The self-capacitance mode has an obvious technical characteristic compared with the mutual-capacitance mode. That is, the number of channels of touch traces of a touch structure in the self-capacitance mode is more than that of touch traces of a touch structure in the mutual-capacitance mode.

Due to the limitation of the number of channels of the touch traces, the number of the traces led out from the touch structure in the self-capacitance mode is much greater than that led out from the touch structure in the mutual-capacitance mode, so that a size of the lower frame is increased, which cannot meet the development trend of the narrow frame of the existing mobile phone.

SUMMARY

The present disclosure provides a touch structure, a touch display panel and an electronic device.

In a first aspect, the touch structure includes a substrate, wherein the touch structure is divided into a touch region and a lower frame region connected to the touch region; the touch structure further includes: a touch electrode array and a plurality of touch traces in the touch region, wherein the touch electrode array is on the substrate and includes a plurality of touch electrodes arranged in a plurality of rows and a plurality of columns, and the plurality of touch traces are respectively electrically connected to the plurality of touch electrodes; and a plurality of touch leads in the lower frame region, wherein the plurality of touch leads are electrically connected to the touch traces, respectively; and wherein orthographic projections of every two adjacent touch traces of the plurality of touch traces on the substrate do not overlap with each other, a distance between the orthographic projections of the every two adjacent touch traces on the substrate at a first position close to the lower frame region is larger than or equal to a distance between the orthographic projections of the every two adjacent touch traces on the substrate at a second position close to the lower frame region; wherein the first position is farther away from the lower frame region, the second position is closer to the lower frame region; each touch trace of the plurality of touch traces includes a starting point on a side of the touch region away from the lower frame region and an end point on a side of the touch region close to the lower frame region and connected to a corresponding touch lead, and a distance between two starting points of every two adjacent touch traces in the first direction is larger than a distance between two end points of the two touch traces in the first direction.

In some embodiments, an orthographic projection of each of the plurality of touch traces on the substrate is a folding line.

In some embodiments, each of the plurality of touch electrodes is a grid electrode block including a plurality of metal grids, and at least a portion of an orthographic projection of each of the plurality of touch traces on the substrate overlaps with orthographic projections of the plurality of metal grids of the grid electrode blocks of the plurality of touch electrodes on the substrate.

In some embodiments, the plurality of touch traces and the plurality of touch electrodes are both made of metal materials.

In some embodiments, an orthographic projection of each touch trace on the substrate is a straight line, and the touch trace is made of a transparent conductive material.

In some embodiments, a distance between orthographic projections of starting points of every two adjacent touch traces on the substrate is 1.5 to 3 times of a distance between orthographic projections of end points of the two adjacent touch traces on the substrate.

In some embodiments, the distance between the orthographic projections of the starting points of every two adjacent touch traces on the substrate is 2 times of the distance between the orthographic projections of the end points of the two adjacent touch traces on the substrate.

In some embodiments, the touch electrode array includes a first metal grid layer including a plurality of grid blocks serving as the plurality of touch electrodes and electrically insulated from each other, the first metal grid layer includes a plurality of first metal grid sub-strips, a plurality of second metal grid sub-strips and a plurality of third metal grid sub-strips so as to form a plurality of repeating units, and each repeating unit includes one first metal grid sub-strip, one second metal grid sub-strip and one third metal grid sub-strip arranged along a first direction; and each repeating unit includes a plurality of repeating sub-units arranged along a second direction.

In some embodiments, each repeating sub-unit includes four rows of blocks, wherein the first row of blocks includes a first block, a second block and a third block sequentially arranged along the first direction, each row of the second row of blocks and the fourth row of blocks includes a second block, a third block and a first block sequentially arranged along the first direction, and the third row of blocks includes a third block, a first block and a second block sequentially arranged along the first direction; and the first block includes a first sub-block and a second sub-block arranged along the first direction and in contact with each other, the second block includes a third sub-block and a first sub-block arranged along the first direction and in contact with each other, and the third block includes a second sub-block and a third sub-block arranged along the first direction and in contact with each other.

In some embodiments, each of the first sub-block, the second sub-block and the third sub-block is a hexagonal sub-block extending along the second direction; a length of the first sub-block along the second direction is greater than that of each of the second sub-block and the third sub-block along the second direction; and the first blocks and the second blocks in the adjacent rows are arranged in the first direction in a staggered way by a predetermined distance, so that the third sub-block in each second block is between the first and second sub-blocks in the corresponding first block in the first direction; the second blocks and the third blocks in the adjacent rows are arranged in the first direction in a staggered way by a predetermined distance, so that the second sub-block in each second block is between the third and first sub-blocks in the corresponding third block in the first direction; and the first blocks and the third blocks in the adjacent rows are arranged in the first direction in a staggered way by a predetermined distance, so that the second sub-block in each third block is between the first and second sub-blocks in the corresponding first block in the first direction.

In some embodiments, each repeating sub-unit includes three rows of blocks, wherein the first row of blocks includes a first block, a second block and a third block sequentially arranged along a first direction, the second row of blocks includes a second block, a third block and a first block sequentially arranged along the first direction, and the third row of blocks includes a third block, a first block and a second block sequentially arranged along the first direction; and the first block includes a first sub-block and a second sub-block which are arranged along a first direction and are in contact with each other, the second block includes a third sub-block and a first sub-block which are arranged along the first direction and are in contact with each other, and the third block includes a second sub-block and a third sub-block which are arranged along the first direction and are in contact with each other.

In some embodiments, each of the first, second and third sub-blocks is a rectangular sub-block extending along the second direction; a length of the first sub-block along the second direction is greater than that of each of the second sub-block and the third sub-block along the second direction; and the first blocks and the second blocks in the adjacent rows are aligned with each other in the first direction, the second blocks and the third blocks in the adjacent rows are aligned with each other in the first direction; and the first blocks and the third blocks in the adjacent rows are aligned with each other in the first direction.

In some embodiments, the plurality of touch traces and the first metal grid layer are in different layers; and orthographic projections of starting points of the plurality of touch traces on the first metal grid layer are respectively among the plurality of first metal grid sub-strips, the plurality of second metal grid sub-strips and the plurality of third metal grid sub-strips.

In some embodiments, orthographic projections of the end points of the plurality of touch traces of the plurality of grid blocks of the plurality of touch electrodes on the substrate are between the adjacent first and second sub-blocks, between the adjacent second and third sub-blocks, and between the adjacent third and first sub-blocks, respectively.

In some embodiments, the plurality of touch traces and the first metal grid layer are respectively on a first surface and a second surface of the substrate, and the plurality of touch electrodes include a plurality of bridging electrodes, and the bridging electrode of each touch electrode penetrates through a via hole in the substrate to be electrically connected to the corresponding touch trace.

In some embodiments, the touch region includes a touch region symmetry axis extending along the second direction, and the plurality of touch electrodes in the touch region are symmetrically distributed with respect to the touch region symmetry axis; the plurality of touch electrodes include a plurality of bridging electrodes, and the bridging electrode of each touch electrode is electrically connected to the corresponding touch trace; and for each column of touch electrodes, the closer the touch electrode is to the lower frame region in the second direction, the farther the bridging electrode of the touch electrode is from the touch region symmetry axis in the first direction.

In some embodiments, the touch region includes a touch region symmetry axis extending along the second direction, and the plurality of touch electrodes in the touch region are symmetrically distributed with respect to the touch region symmetry axis; the plurality of touch electrodes include a plurality of bridging electrodes, and the bridging electrode of each touch electrode is electrically connected to the corresponding touch trace; and a distance between each bridging electrode of each column of touch electrodes and the touch region symmetry axis in the first direction is substantially constant.

In some embodiments, each column of touch electrodes include a touch electrode symmetry axis parallel to the touch region symmetry axis, and the bridging electrodes of the column of touch electrodes are arranged on a same side of the touch electrode symmetry axis close to the touch region symmetry axis.

In some embodiments, the touch region includes a touch region symmetry axis extending along the second direction, and for each column of touch electrodes, the closer the touch electrode is to the lower frame region in the second direction, the closer the bridging electrode of the touch electrode is from the touch region symmetry axis in the first direction.

In some embodiments, each column of touch electrodes include a touch electrode symmetry axis parallel to the touch region symmetry axis, and the bridging electrodes of the column of touch electrodes are arranged on a same side of the touch electrode symmetry axis close to the touch region symmetry axis.

In a second aspect, the touch display panel includes a display substrate and the touch structure.

In some embodiments, the display substrate includes a plurality of pixel units, wherein each pixel unit includes a first sub-pixel, a second sub-pixel and a third sub-pixel; and an orthographic projection of the first sub-block on the substrate surrounds an orthographic projection of the first sub-pixel on the substrate, an orthographic projection of the second sub-block on the substrate surrounds an orthographic projection of the second sub-pixel on the substrate, and an orthographic projection of the third sub-block on the substrate surrounds an orthographic projection of the third sub-pixel on the substrate.

In some embodiments, the first sub-pixel includes a green sub-pixel, the second sub-pixel includes a red sub-pixel, and the third sub-pixel includes a blue sub-pixel.

In a third aspect, the electronic device includes the touch display panel described above.

BRIEF DESCRIPTION OF DRAWINGS

The accompanying drawings, which are provided for further understanding of embodiments of the present disclosure and constitute a part of this specification, are for explaining the present disclosure together with the embodiments of the present disclosure, but are not intended to limit the present disclosure. The above and other features and advantages will become more apparent to a person skilled in the art by describing in detail exemplary embodiments thereof with reference to the drawings. In the drawings.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Figure 1:
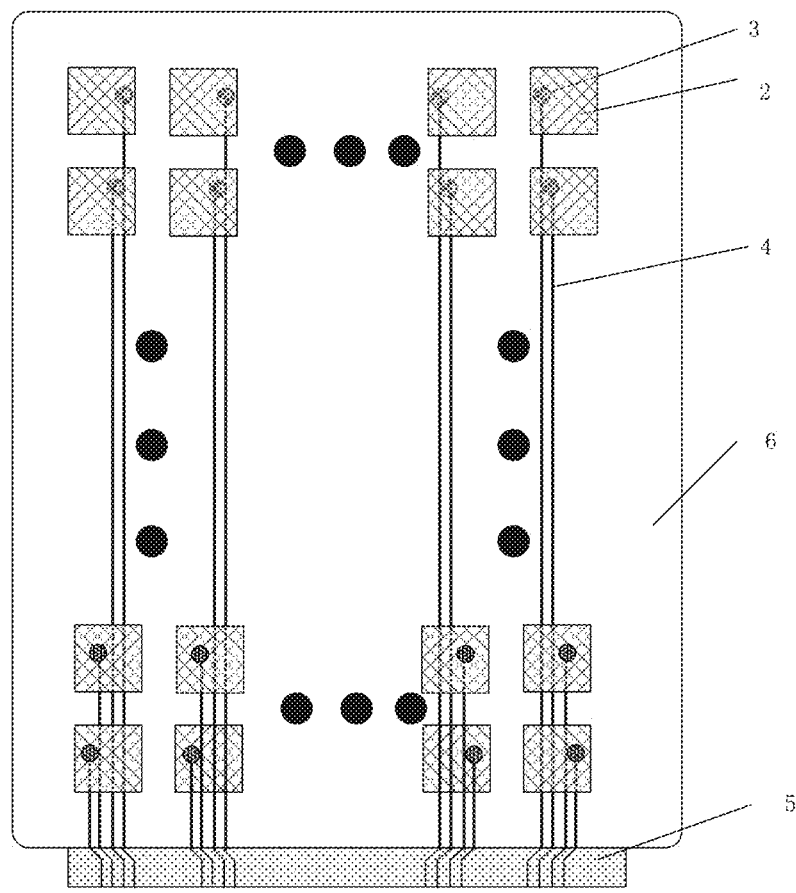
FIG. 1 is a schematic diagram illustrating touch traces of a self-capacitance touch structure in the related art.

As shown in FIG. 1, touch traces 4 of a touch structure in a self-capacitance mode in the related art are usually provided in a direct-type way. That is, the touch traces 4 are disposed at an equal distance in a touch region 6 (e.g., a region corresponding to a display region in a touch display panel) and extend from a top end to an edge of the touch region 6 close to a lower frame region 5, and are connected to touch leads in the lower frame region 5, which in turn converged together and led out. Therefore, the lower frame region 5 generally includes a sector region for the touch leads to be converged and a wire collection region for leading out the converged touch leads. In the touch structure shown in FIG. 1, the touch traces extend over the entire width of the lower frame region at an edge of the lower frame region, so that the sector region for converging the touch leads connected to the touch traces occupies a larger area, and the wire collection region for leading out the converged touch leads occupies a larger width. Thus, with this arrangement, a wider lower frame may be required.

Figure 2:
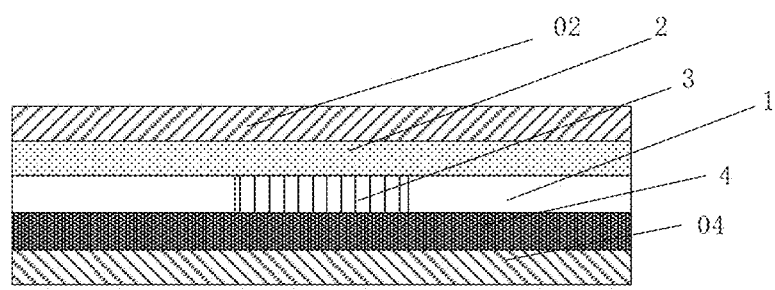
FIG. 2 is a schematic diagram illustrating a layout of touch traces of a self-capacitance touch structure in the related art.

FIG. 2 illustrates a layer structure of the touch structure in the embodiment shown in FIG. 1. In the embodiment, touch electrodes 2 and the touch traces 4 may be disposed on two sides of a substrate 1. For example, the touch traces 4 are disposed in a bottom layer relative to the touch electrodes 2, and the touch electrodes 2 and the corresponding touch traces are electrically connected to each other through bridging electrodes 3 made of a conductive material in via holes formed in the substrate 1. A first insulating layer 04 and a second insulating layer 02 may be respectively disposed outside the touch traces 4 and the touch electrodes 2 to form the touch structure.

Figure 3:
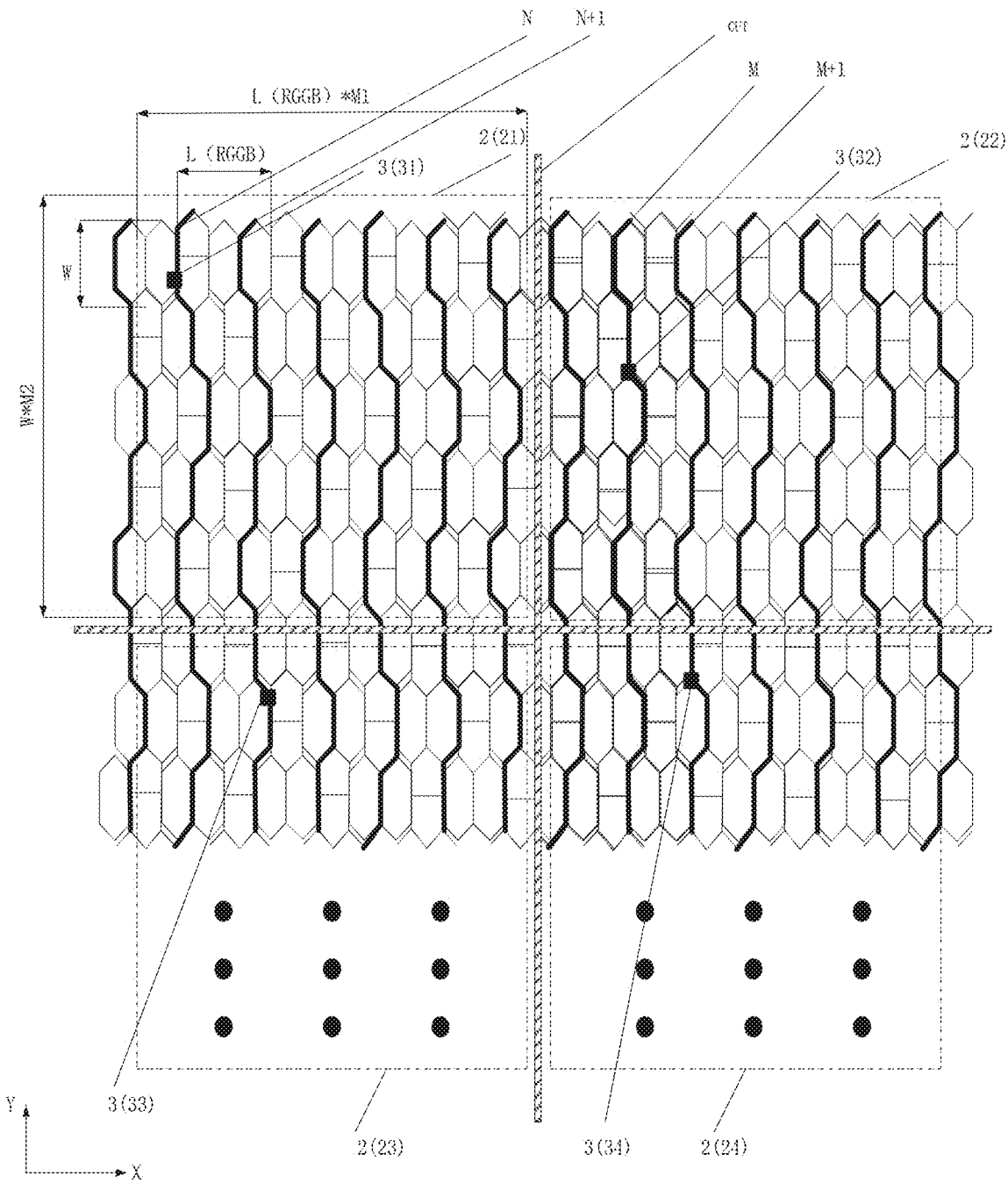
FIG. 3 is a schematic diagram illustrating a layout of touch traces of a self-capacitance touch structure in the related art.

FIG. 3 is a schematic diagram illustrating a layout of touch electrodes and touch traces of a touch structure in the related art. Each touch electrode of the touch structure is composed of touch grid lines. As shown in FIG. 3, the touch structure includes the plurality of touch electrodes 2 (e.g., a first touch electrode 21, a second touch electrode 22, a third touch electrode 23, and a fourth touch electrode 24), each of which is a touch grid block formed by a plurality of touch grid lines. The adjacent touch electrodes 2 are electrically insulated from each other, to realize the touch structure in the self-capacitance mode. The touch structure includes the plurality of touch traces, such as a first touch trace N, a second touch trace N+1, a third touch trace M, and a fourth touch trace M+1. The touch traces and the touch grid lines of the touch electrodes are disposed in different metal layers, and are correspondingly connected to each other through the bridging electrodes 3 (e.g., a first bridging electrode 31, a second bridging electrode 32, a third bridging electrode 33 and a fourth bridging electrode 34) in an insulating layer between the different metal layers. As shown in FIG. 3, the first touch electrode 21 is connected to the corresponding first touch trace N through the first bridging electrode 31, the third touch electrode 23 is connected to the corresponding second touch trace N+1 through the third bridging electrode 33, the second touch electrode 22 is connected to the corresponding third touch trace M through the second bridging electrode 32, and the fourth touch electrode 24 is connected to the corresponding fourth touch trace M+1 through the fourth bridging electrode 34.

As shown in FIG. 3, the touch structure with this structure and a display substrate with an RGGB structure may form a touch display panel, where the light emission of the touch display panel is not affected by patterns of the touch electrodes. On one hand, the metal grid lines of the touch electrodes forming the touch structure are arranged to extend along edges of sub-pixels in the display substrate with the RGGB structure, so that the touch grid lines can be prevented from affecting the light emission of the sub-pixels; on the other hand, the touch traces of the touch structure are also arranged to extend along the edges of the sub-pixels, so that the touch traces can be prevented from affecting the light emission of the sub-pixels.

A size of each touch electrode may be set according to actual needs, and an orthographic projection of each touch electrode on the substrate may cover M1×M2 pixels, that is, the size of each touch electrode is L (RGGB) (a length of each pixel)×M1×W (a width of each pixel)×M2.

Figure 4:
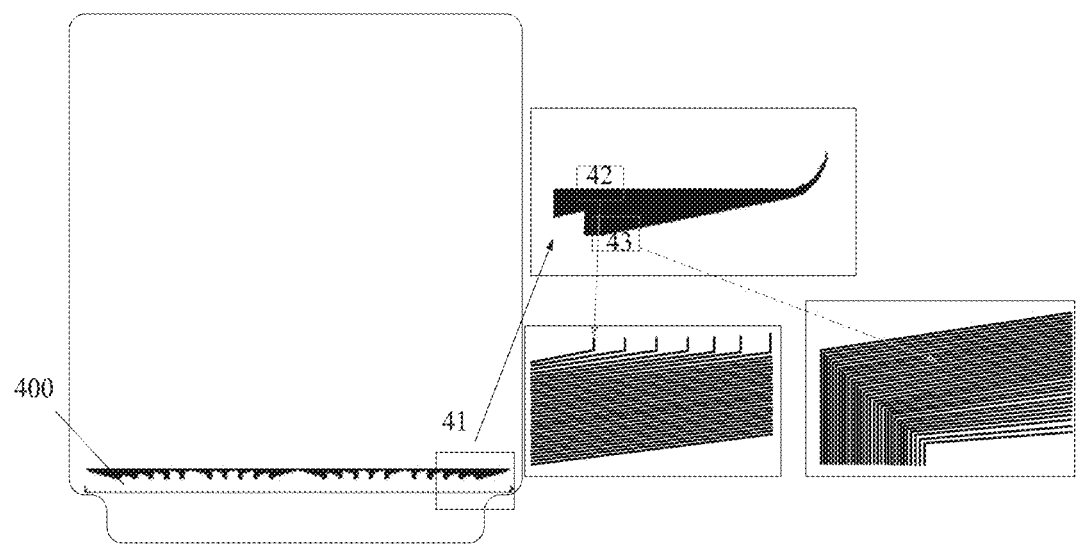
FIG. 4 is a schematic diagram illustrating an electrical connection between touch traces and touch leads in a lower frame region of a self-capacitance touch structure in the related art.

FIG. 4 illustrates a layout 400 of the touch traces in the lower frame region of the touch structure employing the direct-type touch traces shown in FIG. 3. The touch traces in the generally rounded quadrilateral touch region extend to an interface 42 between the touch region and the lower frame region in the direct-type way, and the touch traces are firstly converged at a position 43 in the lower frame region and then led out of the lower frame region. Because the direct-type touch traces are adopted, and the rounded touch traces 41 are arranged at round corners below in the touch region, as shown in FIG. 4, the touch traces led out from the touch region are distributed over the whole lower frame region, so that the rounded touch traces 41 having a slightly warped shape as shown in FIG. 4 are formed, and are converged and led out in the lower frame region, so that a wider lower frame region is required.

In order to obtain a touch structure with a narrow frame, the present disclosure provides a touch structure; the touch structure includes a substrate and is divided into a touch region and a lower frame region connected to the touch region; a touch electrode array and a plurality of touch traces provided in the touch region, wherein the touch electrode array is arranged on the substrate and includes a plurality of touch electrodes arranged in a plurality of rows and a plurality of columns, and the plurality of touch traces are respectively electrically connected to the plurality of touch electrodes; and a plurality of touch leads provided in the lower frame region, wherein the plurality of touch leads are electrically connected to the touch traces, respectively; orthographic projections of every two adjacent touch traces of the plurality of touch traces on the substrate do not overlap with each other, a distance between the orthographic projections of the every two adjacent touch traces on the substrate at a first position close to the lower frame region is larger than or equal to a distance between the orthographic projections of the every two adjacent touch traces on the substrate at a second position close to the lower frame region; wherein the first position is farther away from the lower frame region, the second position is closer to the lower frame region; each touch trace of the plurality of touch traces includes a starting point positioned on a side of the touch region away from the lower frame region and an end point positioned on a side of the touch region close to the lower frame region and connected to a corresponding touch lead, and a distance between two starting points of every two adjacent touch traces in the first direction is larger than a distance between two end points of the two touch traces in the first direction.

Figure 5:
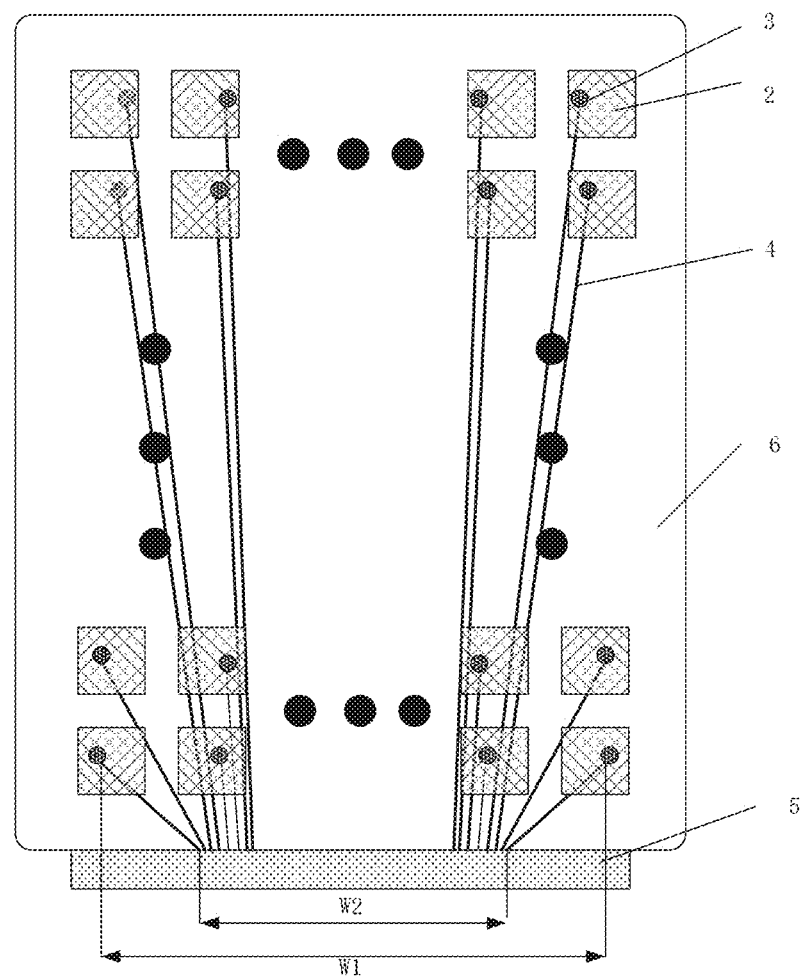
FIG. 5 is a schematic diagram illustrating a layout of touch traces of a touch structure according to an embodiment of the present disclosure.

FIG. 5 is a schematic diagram illustrating a layout of touch traces of a touch structure according to an embodiment of the present disclosure. Compared with the layout of the direct-type touch traces of the touch structure in the related art shown in FIG. 1, in the embodiment of the present disclosure, the touch traces 4 are converged toward an central axis of the touch region during the touch traces extend along directions in the touch region 6, that is, the extending directions of the touch traces are adjusted during the touch traces extend toward the lower frame region 5 in the touch region 6, so that the touch traces at the edge of the touch region approach to a center of the edge of the touch region, and thus a distance between two outermost touch traces 4 at the edge of the lower frame region 5 is changed from a first width W1 to a second width W2. Because the plurality of touch traces 4 are densely arranged at the edge of the lower frame region 5, the lower frame region 5, where the touch leads electrically connected to the touch traces are converged together and led out, does not need to be set wider.

As shown in FIG. 5, orthographic projections of the touch traces 4 of the touch structure of the embodiment of the present disclosure on the substrate do not overlap with each other, so that all touch traces of the touch structure can be ensured to be formed in one metal layer, and thus, the manufacturing cost can be reduced, and the manufacturing process can be simplified; the two adjacent touch traces 4 extend toward the lower frame region 5 through the first position and the second position, respectively; and in the column direction, the first position is farther away from the lower frame region 5, and the second position is closer to the lower frame region 5; a first distance between the two adjacent touch traces 4 at the first position in the row direction is greater than or equal to a second distance between the two adjacent touch traces 4 at the second position. That is, the plurality of touch traces 4 of the embodiment of the present disclosure may extend toward the lower frame region 5 in the direct-type way, in a converging way, or both (for example, extend in the direct-type way in an upper region of the touch region 6 away from the lower frame region 5, extend in the direct-type way in a lower region of the touch region 6 close to the lower frame region, and extend in the converging way in a middle region between the upper region and the lower region). However, the present disclosure is not limited thereto, and no matter which way is adopted, the touch traces are converged during extending in the touch region, that is, each of the plurality of touch traces includes the starting point away from the lower frame region 5 and the end point close to the lower frame region 5 and connected to the corresponding touch lead; and a distance between two starting points of every two adjacent touch traces in the row direction is larger than or equal to a distance between two end points of the two touch traces in the row direction. With the above arrangement for the touch traces, the touch traces have been already converged in the touch region when extending to the edge of the lower frame region 5, so that the distance between the two outermost touch traces is narrowed at the edge of the lower frame region, and a narrow lower frame region is realized.

In the embodiment shown in FIG. 5, each touch electrode 2 is electrically connected to the corresponding touch trace 4 through the bridging electrode 3, and an orthographic projection of the starting point of each touch trace 4 on the substrate is located within an orthographic projection of the corresponding touch electrode 2 on the substrate; and each touch electrode 2 is connected to the corresponding touch trace 4 through the bridging electrode 3. That is, in this embodiment, orthographic projections of the start point of each touch trace 4 and the corresponding bridging electrode 3 on the substrate at least partially overlap with each other. However, the present disclosure is not limited thereto, and the concept of making the touch traces be converged in the touch region is also applicable to the touch structure shown in FIG. 3. It can be seen that in the touch structure shown in FIG. 3, starting points of the touch traces of the touch electrodes 2 are almost on a same straight line extending along the first direction X, and the bridging electrodes 3 corresponding to the touch electrodes are at different positions in the first direction X.

Figure 6A:
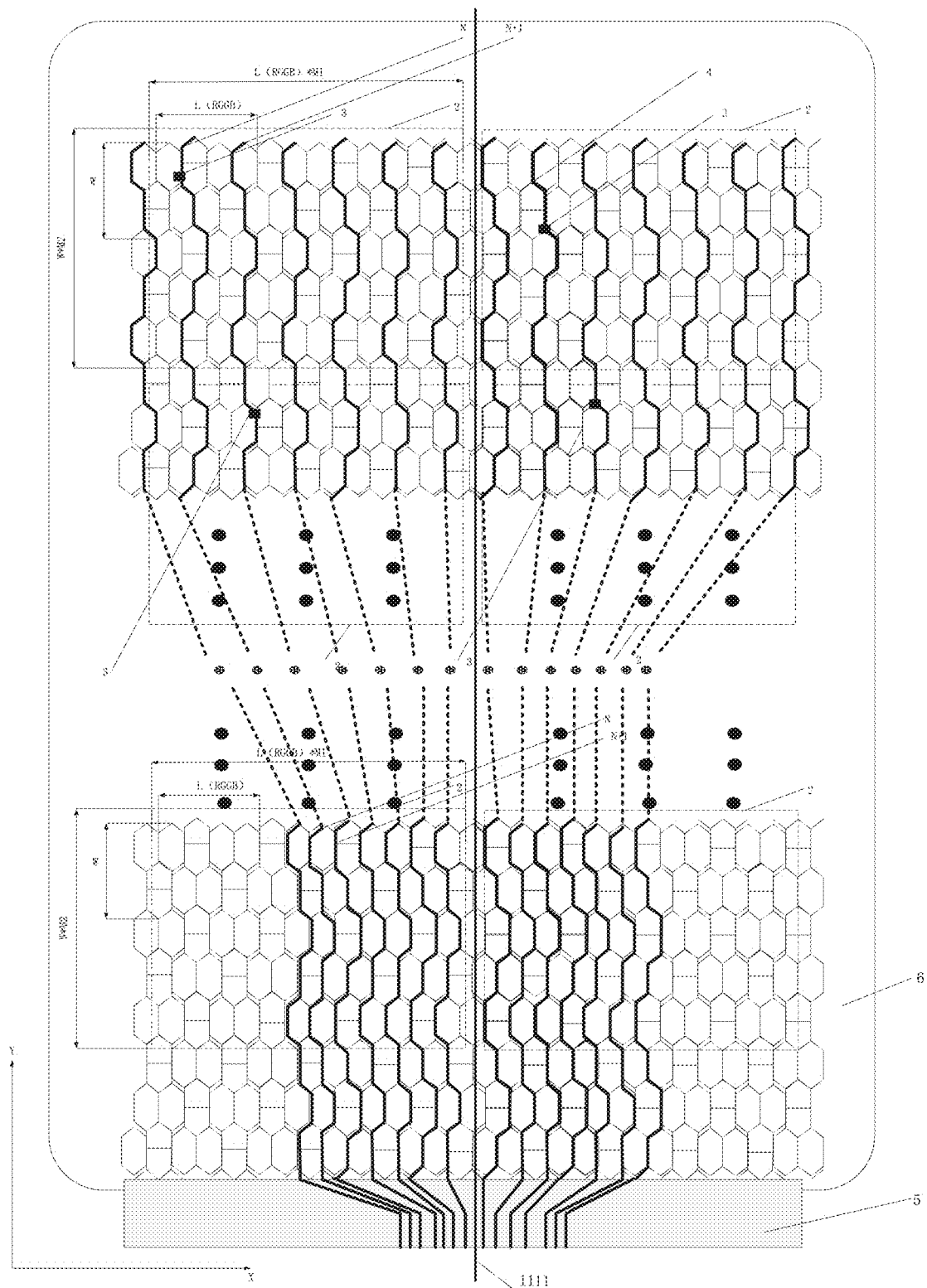
FIG. 6A is a schematic diagram illustrating a layout of touch traces of a touch structure according to an embodiment of the present disclosure.

FIG. 6A shows a schematic diagram of a layout of touch traces according to an embodiment of the present disclosure after improvement is performed on the layout of the touch traces of the touch structure in the related art shown in FIG. 3.

As shown in FIG. 6A, for the touch traces 4 of the touch structure in the embodiment in the upper region of the touch region 6 away from the lower frame region 5, similar to those in the related art, every two adjacent touch traces 4 are separated from each other by two columns of sub-pixels. Unlike the related art shown in FIG. 3, in the touch structure shown in FIG. 6A according to the embodiment of the present disclosure, in the lower region of the touch region 6 adjacent to the lower frame region 5, every two adjacent touch traces 4 are separated from each other by one column of sub-pixels. That is, in this embodiment, the touch traces 4 of the touch structure are all converged toward the symmetry axis 1111 (the touch electrodes in the touch region are symmetrically distributed with respect to the symmetry axis of the touch region) and extend along the column direction of the touch structure. That is, the plurality of touch traces 4 are gradually converged toward the symmetry axis 1111 during extending along the column direction, and the distance between the two outermost touch traces 4 at the edge of the lower frame region 5 is ½ of the distance between the two starting points of the two outermost touch traces 4, so that the width of the lower frame region 5 can be significantly reduced, advantageously realizing a narrow frame.

Figure 6B:
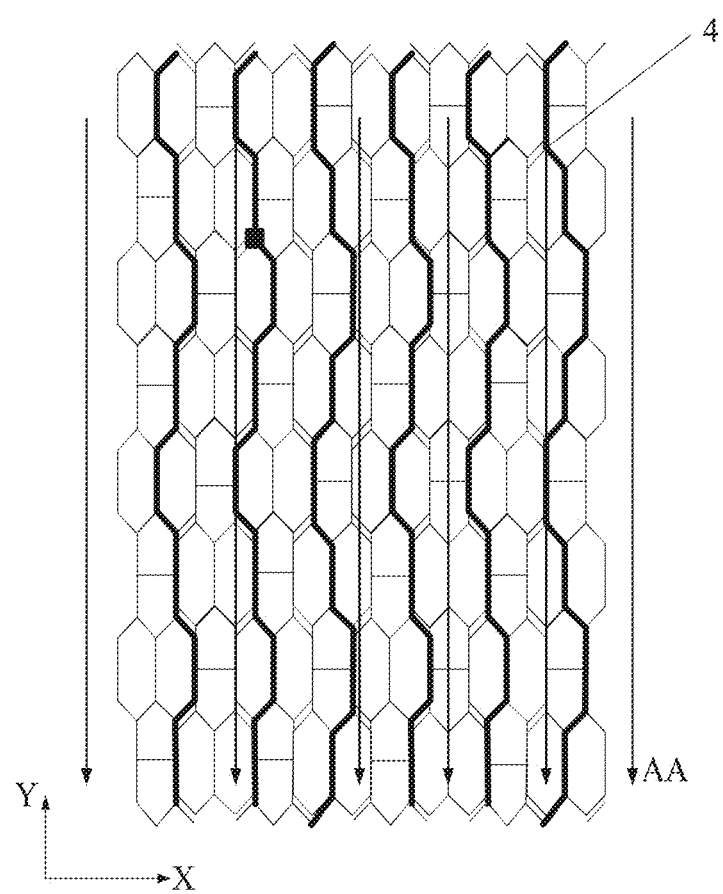
FIG. 6B is a schematic diagram illustrating a layout of touch traces of a touch structure in the related art.

FIG. 6B shows the touch structure in which the touch traces extend in the direct-type way (as indicated by an arrow AA) in the prior art. In the touch structure, the plurality of touch traces 4 in the entire touch region extend to the lower frame region substantially along the second direction Y, so that at the interface between the touch region and the lower frame region, the plurality of touch traces 4 extend over the width of the entire lower frame region along the first direction X, so that it is necessary to provide a wider lower frame region for converging the touch traces with a larger distribution, the area occupied by the converged touch traces is relatively larger, and the converged touch leads to be led out are relatively wider, which results in a wider lower frame region.

Figure 6C:
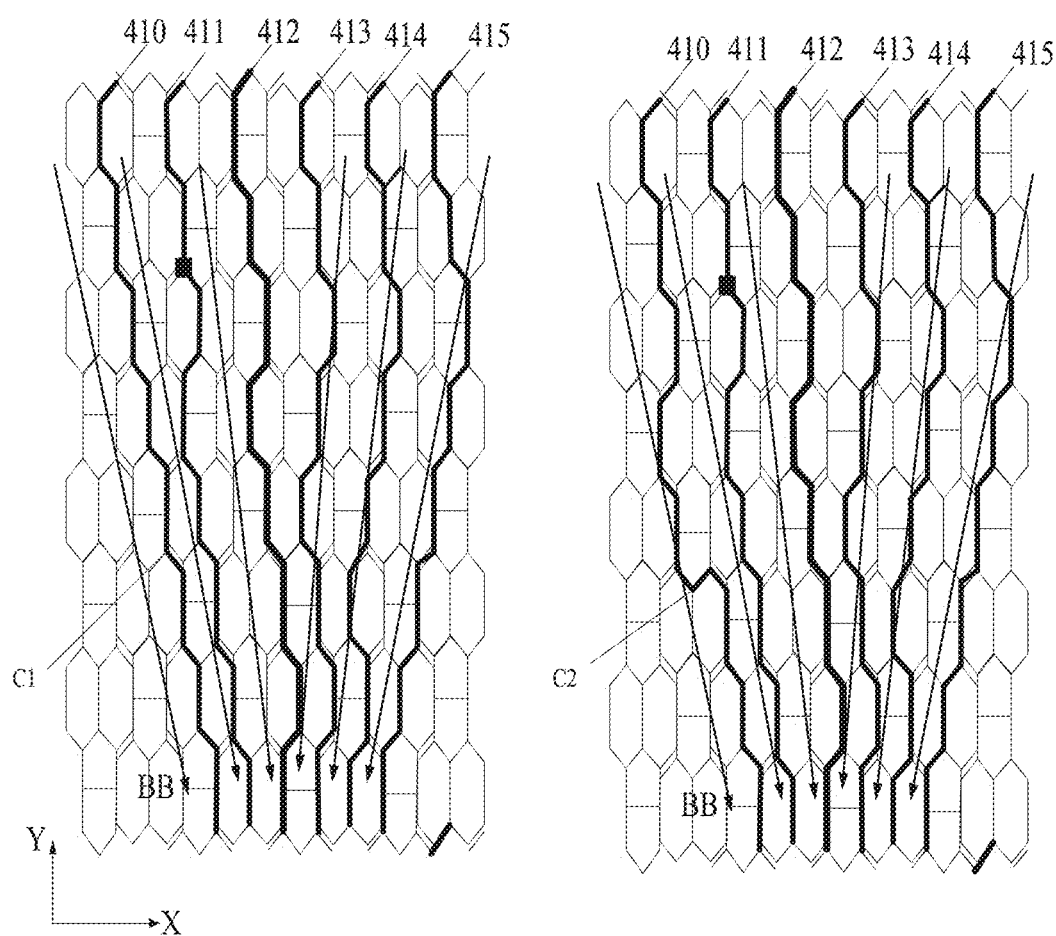
FIGS. 6C to 6E each is a schematic diagram illustrating a layout of touch traces of a touch structure according to an embodiment of the present disclosure, respectively.

FIG. 6C illustrates the touch structure in which the touch traces extend in the converging way (as indicated by an arrow BB) according to an embodiment of the present disclosure. As shown in FIG. 6C, in the touch structure in the embodiment, the touch trace 413 still extends toward the lower frame region in the direct-type way relative to other touch traces, and the touch traces 410, 411, and 412 and the touch traces 414 and 415 on both sides of the touch trace 413 are converged toward an extending direction of the touch trace 413. As shown in FIG. 6C, in the embodiment, the touch trace 410 still extends along the grid lines of the touch electrode in the process of converging towards the touch trace 413, so as to prevent the touch traces from blocking the light emission of the sub-pixels on the display substrate integrated with the touch structure in the process of converging. As shown in FIG. 6C, in the converging process, the touch trace 410 may converge by using a first route C1 or a second route C2, and the converging in the first route C1 and the second route C2 enable the touch trace 410 to converge toward the touch trace 413.

Figure 6D:
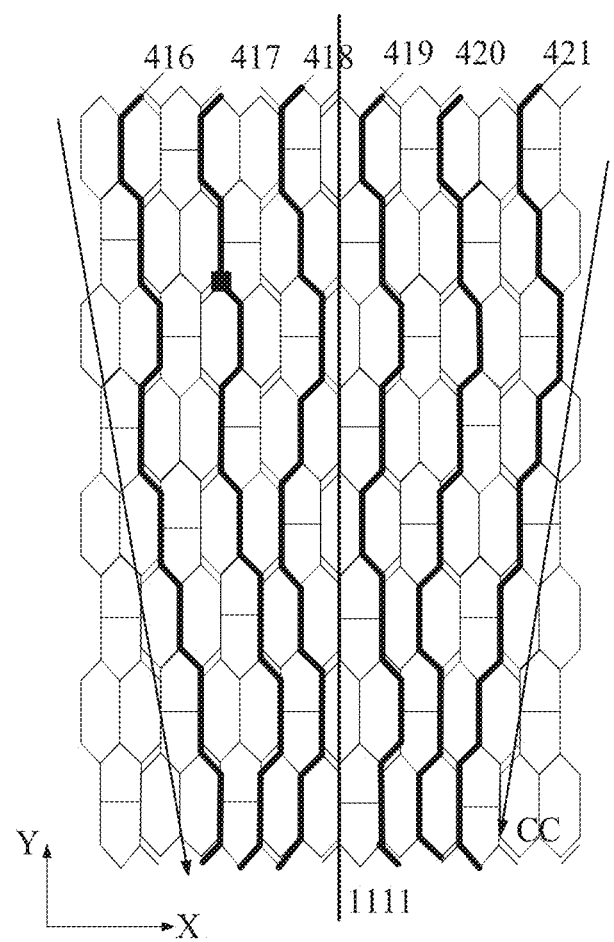

FIG. 6D illustrates the touch structure in which the touch traces extend in the converging way (as indicated by an arrow CC) according to an embodiment of the present disclosure. As shown in FIG. 6D, the touch structure in this embodiment includes a symmetry axis 1111, and the touch traces 410, 411, 412 and the touch traces 413, 414, 415 on two sides of the symmetry axis 1111 converge toward the symmetry axis 1111, that is, the touch traces approach the symmetry axis 1111 along the grid lines of the touch electrodes, and do not pass through openings formed by the touch grid lines during the touch traces extend in the converging way, so as to prevent the touch traces from blocking the light emission of the sub-pixels on the display substrate integrated with the touch structure. In this case, a material of the touch traces 4 may include a metal material.

Figure 6E:
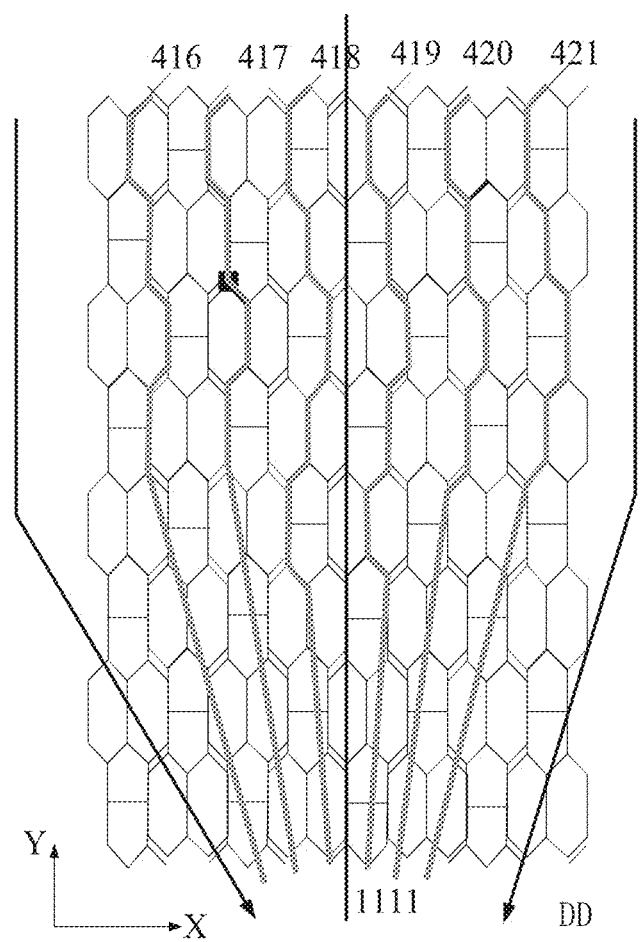

In an optional embodiment, the touch traces 4 may alternatively pass through the openings formed by the touch grid lines during the touch traces extend in the converging way, as shown in FIG. 6E. In this embodiment, the portions of the touch traces 4 away from the lower frame region extend in the direct-type way, and then extend in an oblique manner to directly converge to the interface between the touch region and the lower frame region when converging. In this case, the material of the touch traces 4 may include a transparent conductive material. In the converging way, the layout of the touch traces 4 can be realized more easily, and the width of the lower frame region occupied by the touch traces converging to the interface between the touch region and the lower frame region can be smaller.

Specifically, FIGS. 7A to 7H are layout schematic diagrams and cross-sectional views of the touch traces of the touch structure before converging according to an embodiment of the present disclosure, respectively. FIGS. 7I to 7K are layout schematic diagrams and cross-sectional views of the touch traces of the touch structure after converging according to an embodiment of the present disclosure, respectively.

Figure 7A:
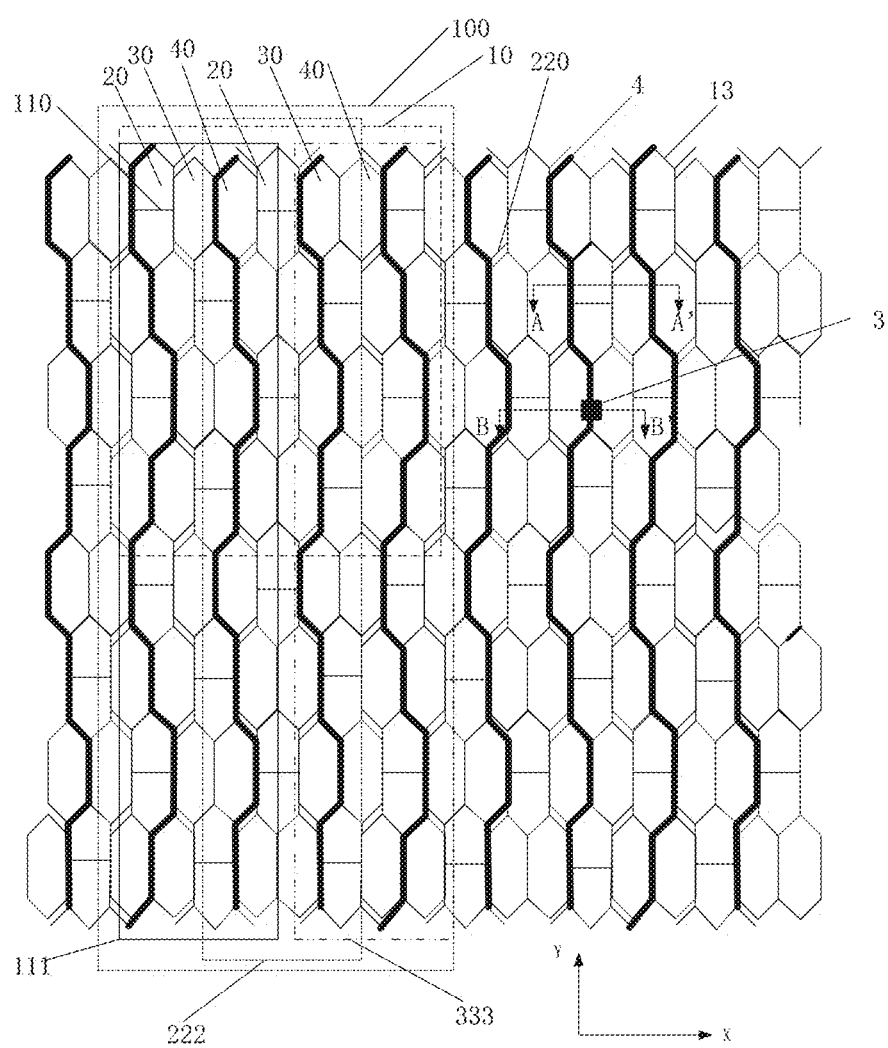
FIGS. 7A to 7K are schematic diagrams and cross-sectional views illustrating respective portions of the touch traces of the touch structure shown in FIGS. 6A and 6B according to an embodiment of the present disclosure, respectively.
Figure 7B:
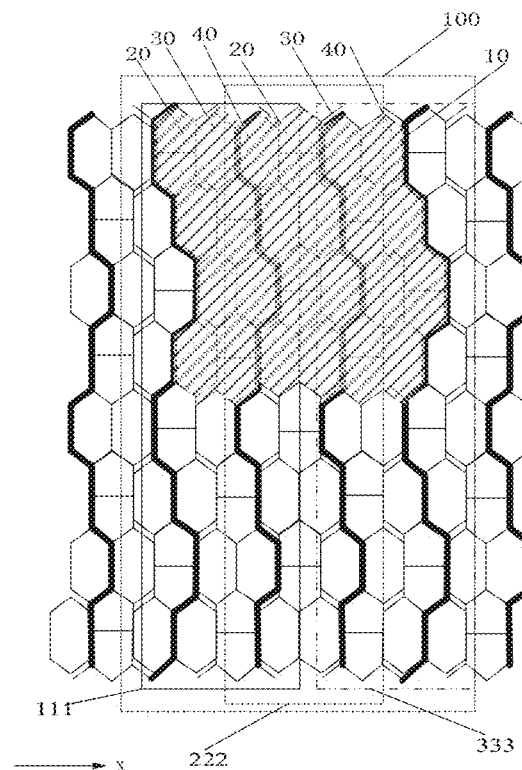
Figure 7C:
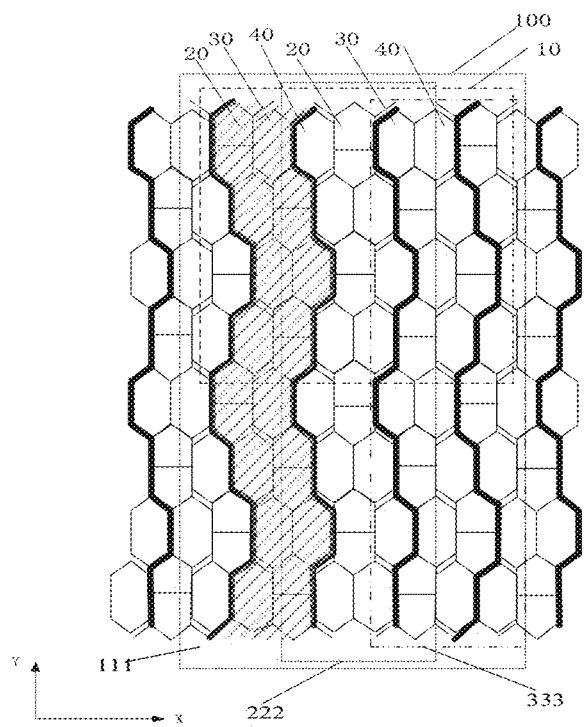
Figure 7D:
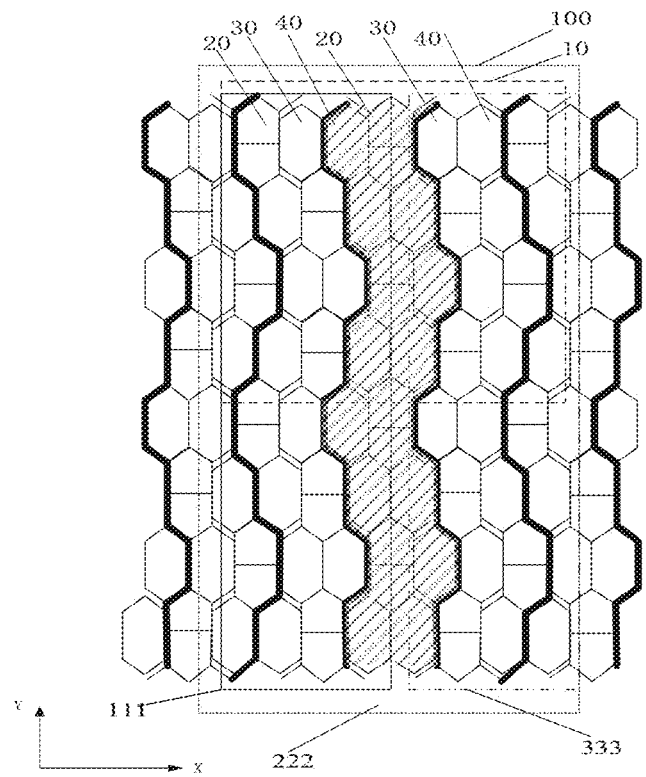
Figure 7E:
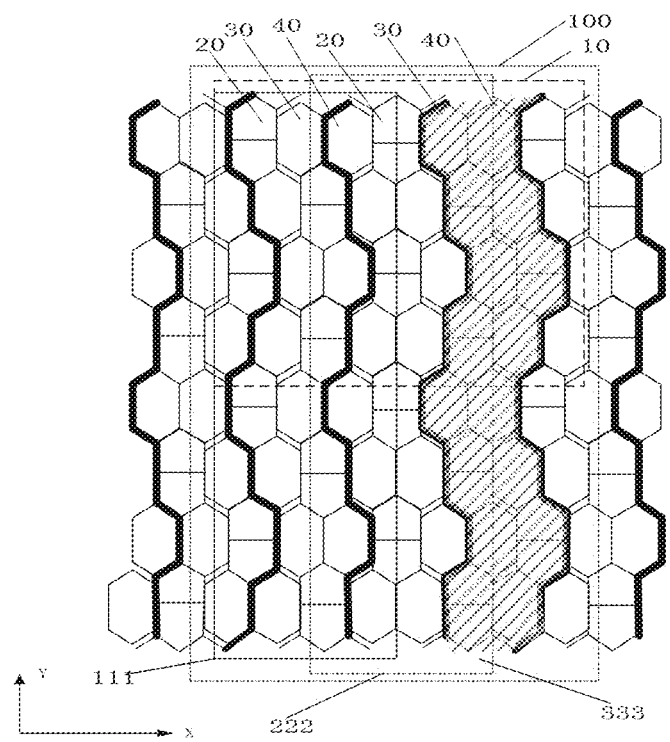

FIG. 7A is a schematic diagram only showing a layout of the touch traces in a part of the upper region of the touch region away from the lower frame region 5 of the touch structure according to an embodiment of the present disclosure; FIG. 7B to FIG. 7F respectively illustrate exploded schematic diagrams of the touch traces in a part of the upper region of the touch region away from the lower frame region 5 of the touch structure shown in FIG. 7A according to an embodiment of the present disclosure; FIG. 7G illustrates a cross-sectional view of the touch structure shown in FIG. 7A taken along a line AA'; FIG. 7H illustrates a cross-sectional view of the touch structure shown in FIG. 7H taken along a line BB'.

As shown in FIGS. 7A to 7H, the touch structure of the present disclosure may include the substrate 1, the touch electrode array formed by the plurality of touch electrodes 2 disposed on a first surface 200 (e.g., an upper surface) of the substrate 1, and the plurality of touch traces 4 on a second surface 300 (e.g., a lower surface), where each touch trace 4 is connected to one corresponding touch electrode 2, so as to transmit a touch electrode signal induced by the touch electrode 2 to the lower frame region 5 and then to a processor for analysis processing. Each touch electrode 2 is connected to the corresponding touch trace 4 through the conductive material (e.g., the bridging electrode 3) in a via hole formed in the substrate 1.

In the touch structure of the present disclosure, orthographic projections of the touch traces 4 corresponding to the plurality of touch electrodes 2 in the touch region 6 on the substrate 1 do not overlap with each other, which can ensure that the touch traces 4 corresponding to all the touch electrodes 2 can be provided in one metal layer rather than in different layers, thereby avoiding the process complexity.

Specifically, as shown in FIG. 7A, the touch structure of the present disclosure includes the substrate 1, and a first metal grid layer TM1 and a second metal grid layer TM2 respectively disposed on the first surface 200 and the second surface 300 of the substrate 1 opposite to each other. As shown in FIGS. 7A and 7B, the first metal grid layer TM1 formed on the first surface 200 includes a plurality of metal grid lines 13 shown with the narrow line width, some of which are connected to each other such that the plurality of metal grid lines 13 are arranged in a grid as a whole; the second metal grid layer formed on the second surface 300 includes the plurality of touch traces 4 shown with the wide line width, which extend along the second direction Y (e.g., the column direction) orthogonal to the first direction X (e.g., the row direction) and may be sequentially arranged along the first direction X. For example, the plurality of touch traces 4 may be uniformly arranged at substantially equal intervals at positions away from or close to the lower frame region.

As shown in FIG. 7A, the first and second metal grid layers TM1 and TM2 formed on different surfaces of the substrate 1 are shown in thin and thick lines, respectively. That is, in the present disclosure, the first and second metal grid layers TM1 and TM2 are disposed in different layers. In the way as shown in FIG. 7A, it is merely for differentiating the first metal grid layer TM1 from the second metal grid layer TM2, and does not indicate the actual line widths of the metal lines in the first and second metal grid layers TM1 and TM2. For example, in the present application, the widths of the metal lines in the first and second metal grid layers TM1 and TM2 may be in the range of 2 μm to 10 μm, for example, in the range of 3 μm to 5 μm.

FIG. 7G shows a cross-sectional view of the touch structure in FIG. 7A along a line AA'. As can be seen from FIG. 7G, the metal grid lines 13 in contact with each other are formed on the first surface 200 of the substrate 1 to form the touch electrodes 2, but the touch grid lines 13 between every two adjacent touch electrodes 2 of the plurality of touch electrodes 2 are disconnected from each other. For example, a notch CUT is formed between the every two touch electrodes 2 shown in FIG. 3 to cut off the grid lines between the touch electrodes 2, so that the touch electrodes 2 are electrically insulated from each other to ensure the normal operation of the touch electrodes 2; the touch traces 4 are formed on the second surface 300 of the substrate 1. As can be seen from FIGS. 7A and 7G, at the touch traces 4, the metal grid lines 13 of the first metal grid layer TM1 are disposed on the first surface 200, and one metal grid line 13 is further disposed between two adjacent touch traces 4, so as to form the grid lines of the touch electrode shown in FIG. 7A. In the present disclosure, in the composite view of the orthographic projections of the first metal grid layer TM1 and the second metal grid layer TM2 on the substrate 1 shown in FIG. 7A, the region defined between the two touch traces 4 and including the metal grid lines 13 is one first metal grid strip. Therefore, a plurality of first metal grid strips are disposed on the entire first surface 200 of the substrate 1, and the metal grid lines 13 in the overlapping portions between the orthographic projections of every two adjacent first metal grid strips on the substrate 1 are provided with the touch traces 4 at the corresponding positions on the second surface 300.

Figure 7F:
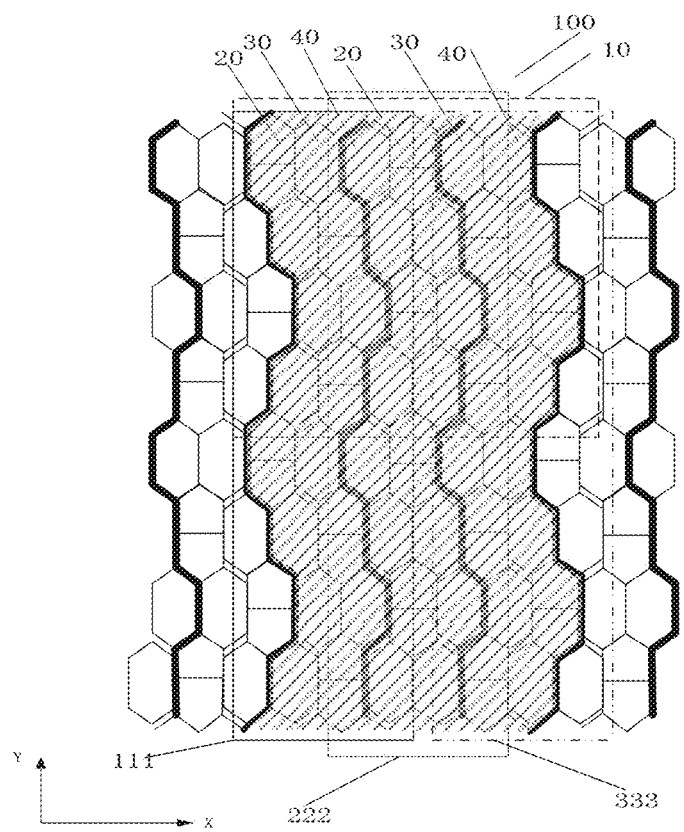
Figure 7G:
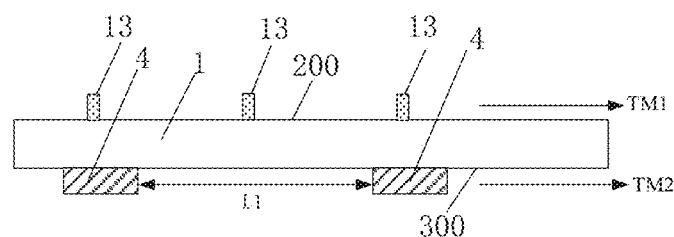
Figure 7H:
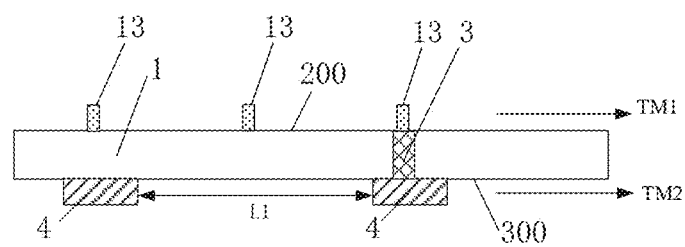
Figure 7I:
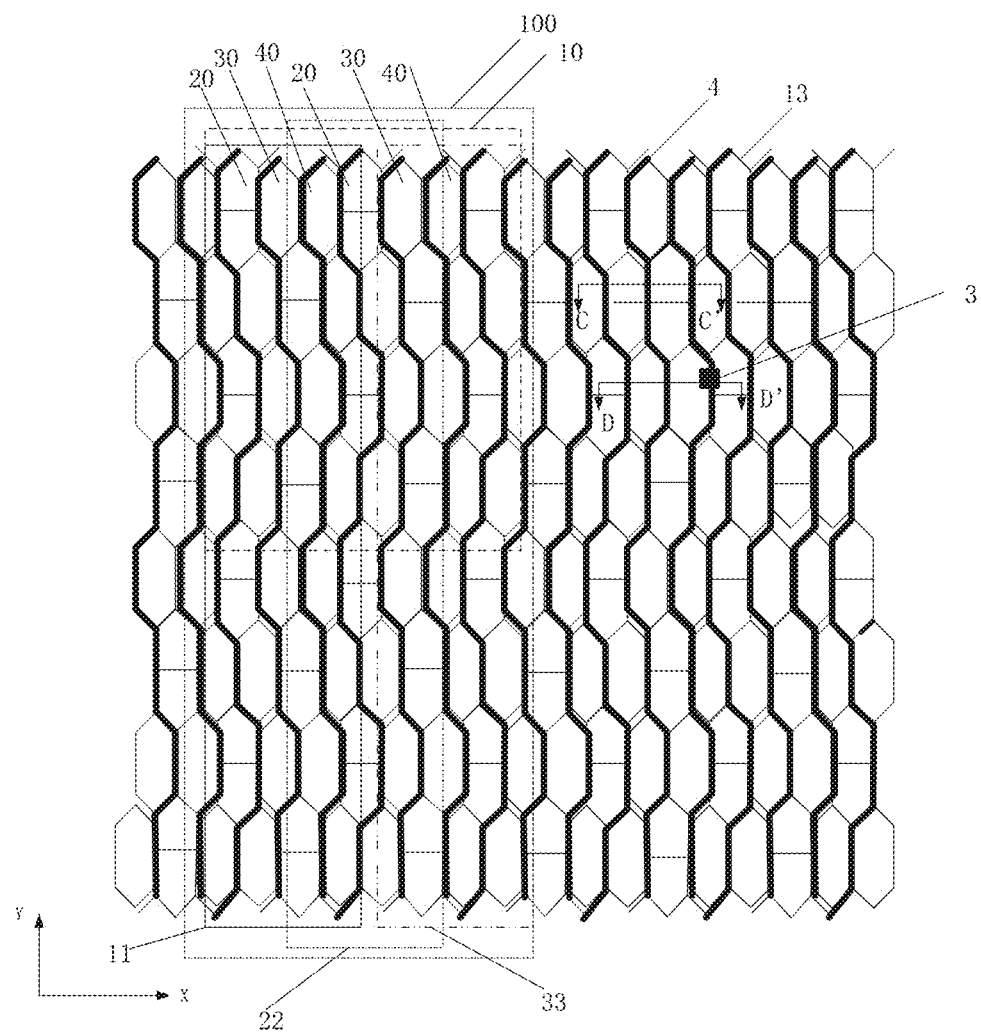
Figure 7J:
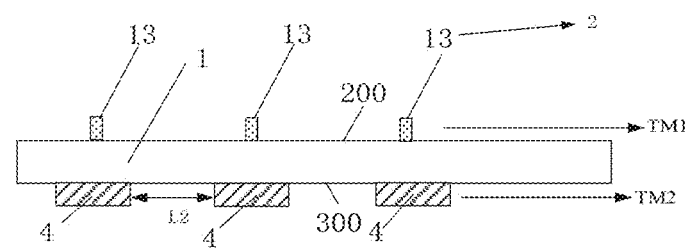
Figure 7K:
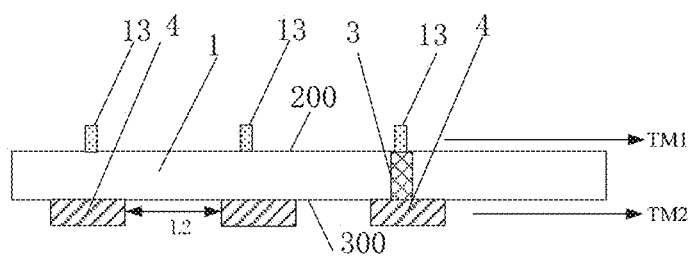

Specifically, as shown in FIG. 7A, orthographic projections of all of the plurality of first metal grid strips on the substrate 1 may include a plurality of first metal grid sub-strips 111 (shown by the hatching of FIG. 7C, each first metal grid sub-strip 111 includes metal grids in an region on the first metal grid layer TM1 defined by two touch traces 4 extending in the second direction Y, the metal grids include three metal grid lines extending in the second direction Y; wherein orthographic projections of the three metal grid lines on the substrate overlap with orthographic projections of the two touch traces 4 on the substrate, wherein the orthographic projections of two of the three metal grid lines on the substrate overlap the orthographic projections of the two touch traces 4 on the substrate, the orthographic projection of the other grid line on the substrate is located between the orthographic projections of the two touch traces 4 on the substrate), a plurality of second metal grid sub-strips 222 (shown by the hatching of FIG. 7D, each second metal grid sub-strip 222 includes metal grids in an region on the first metal grid layer TM1 defined by two touch traces 4 extending in the second direction Y, the metal grids include two metal grid lines extending along the second direction Y; wherein orthographic projections of the two metal grid lines on the substrate overlap with orthographic projections of the two touch traces 4 on the substrate) and a plurality of third metal grid sub-bands 333 (shown by the hatching in FIG. 7E, each third metal grid sub-band 333 includes metal grids in the region defined by the two touch traces 4 extending along the second direction Y on the first metal grid layer TM1, the metal grids include two metal grid lines extending along the second direction Y; wherein orthographic projections of the two metal grid lines on the substrate overlap with orthographic projections of the two touch traces 4 on the substrate), to form a plurality of repeating units 100, as shown by the hatching region in FIG. 7F; each repeating unit 100 includes one first metal grid sub-band 111, one second metal grid sub-band 222 and one third metal sub-band 333 arranged sequentially along the first direction X; the plurality of repeating units 100 are arranged sequentially along the first direction X; each of the repeating units 100 includes a plurality of repeating sub-units 10 arranged along the second direction Y, each of the repeating sub-units 10 includes a structure in four rows and three columns including four first blocks, four second blocks, and four third blocks; a first row includes a first block, a second block, and a third block arranged sequentially along the first direction X, each of the second row and the fourth row includes a second block, a third block, and a first block arranged sequentially along the first direction, a third row includes a third block, a first block, and a second block arranged sequentially along the first direction, as shown by hatching in FIG. 7B; each of the repeating sub-units includes metal grids in an region defined by the outermost two touch traces 4 of the four touch traces 4 adjacent to each other in the first direction X, the metal grids include the two metal grid lines extending along the second direction Y, wherein orthographic projections of the two metal grid lines on the substrate overlap with orthographic projections of the outermost two touch traces 4 on the substrate. As shown in FIG. 7A, the first block includes a first sub-block 20 and a second sub-block 30 in contact with each other and arranged along the first direction X, the second block includes a third sub-block 40 and a first sub-block 20 in contact with each other and arranged along the first direction X, and the third block includes a second sub-block 30 and a third sub-block 40 in contact with each other and arranged along the first direction X.

The above description is only for convenience of description with respect to the dividing manner of the first metal grid layer of the plurality of touch electrodes forming the touch electrode array. Further, as described above, in the touch structure of the present disclosure, the touch electrode array includes the plurality of touch electrodes in a plurality of rows and a plurality of columns, and the touch electrodes are insulated from each other. Each touch electrode includes a plurality of metal grid lines connected to each other, that is, the adjacent first metal grid sub-band 111 and second metal grid sub-band 222 in each touch electrode share the metal grid lines 13 extending substantially along the second direction Y therebetween, the adjacent second metal grid sub-band 222 and second metal grid sub-band 333 in each touch electrode share the metal grid lines 13 extending substantially along the second direction Y therebetween, and the adjacent third metal grid sub-band 333 and first metal grid sub-band 111 in each touch electrode share the metal grid lines 13 extending substantially along the second direction Y therebetween; similarly, two repeating sub-units in each touch electrode adjacent to each other in the second direction Y share metal grid lines 13 extending substantially along the first direction X therebetween.

In one embodiment, as shown in FIG. 7A, the first sub-block 20, the second sub-block 30 and the third sub-block 40 are all hexagons extending along the second direction Y; a length of the first sub-block 20 along the second direction Y is greater than that of each of the second sub-block 30 and the third sub-block 40 along the second direction Y; and the first blocks and the second blocks in the adjacent rows are arranged in the first direction X in a staggered way by a predetermined distance (about half of a width of the sub-block), the second blocks and the third blocks in the adjacent rows are arranged in the first direction X in a staggered way by a predetermined distance (about half of a width of the sub-block), and the first blocks and the third blocks in the adjacent rows are arranged in the first direction X in a staggered way by a predetermined distance (about half of a width of the sub-block).

Further, as shown in FIG. 7A, each first sub-block 20 is further provided with a first additional metal line 110, which extends along the first direction X and is electrically connected to the plurality of metal grid lines 13, and forms a part of the touch electrode for detecting a touch together with the plurality of metal grid lines 13. The present disclosure is not limited to this, and the first metal grid layer TM1 may include only the plurality of metal grid lines 13, without the additional metal lines 110. In addition, as shown in FIG. 7A, the first metal grid layer TM1 further includes second additional metal grid lines 220 parallel to a portion of a metal grid line 13 forming the grid pattern. For example, in the embodiment shown in FIG. 7A, the second additional metal grid lines 220 are disposed along a direction that has an angle with respect to the first direction X or the second direction Y. The first additional metal grid lines 110 and the second additional metal grid lines 220 are provided, which can increase the coverage rate of the touch grid lines, thereby improving the touch sensitivity. On the other hand, the additional metal grid lines are provided, so that it prevents light-emitting regions of the sub-pixels on the display substrate integrated with the touch structure from being blocked which affects the display quality of the display panel.

As shown in FIG. 7A, the plurality of touch traces 4 extending substantially along the second direction Y on the second surface 300 divides the second surface 300 into a plurality of regions. In the embodiment shown in FIG. 7A, three touch traces 4 are provided in an orthographic projection of each repeating sub-unit 10 on the substrate 1. In the touch structure of the present disclosure, the plurality of touch grid lines 13 on the first surface 200 of the substrate 1 form the touch electrode array including the plurality of touch electrodes. As shown in FIG. 7A, the touch grid lines 13 may be divided into a plurality of touch blocks insulated from each other as needed, each touch block serves as one touch electrode, and each touch trace 4 serves as a touch trace of one touch block (a touch electrode pattern) and is connected to the touch grid lines 13 through the bridging electrodes 3 disposed on the substrate 1, to form touch sensing signal lines of the touch electrode pattern, as shown in FIG. 7H.

Further, as shown in FIG. 7A, in the upper region of the touch structure, the touch traces 4 are sparsely arranged. That is, an orthographic projection of each first metal grid strip on the substrate 1 is approximately within orthographic projections of two adjacent touch traces 4 on the substrate 1. From the above, each first metal grid strip includes a plurality of first sub-blocks 20, a plurality of second sub-blocks 30 and a plurality of third sub-blocks 40, and each column of sub-blocks includes a plurality of first sub-blocks 20, a plurality of second sub-blocks 30 and a plurality of third sub-blocks 40 which are alternately arranged, so that each first metal grid strip will include two columns of sub-blocks.

In the present disclosure, the touch traces 4 on the second surface 300 are converged, so that the touch traces 4 gradually approach to the center of the edge of the touch region close to the lower frame region 5 when extending along the second direction Y, so that the density of the touch traces 4 in the upper region of the touch structure away from the lower frame region 5 is smaller than that in the lower region of the touch structure close to the lower frame region 5 (as shown in FIG. 7I), so that in the lower region of the touch structure, the touch traces 4 are closer to each other, the arrangement density is increased, and then the plurality of touch leads, which are connected to the corresponding touch traces 4 and are disposed in the lower frame region 5, may be provided closer to each other, thereby reducing the size of the sector region for converging the plurality of touch leads in the lower frame region 5, further reducing the size of the lower frame region, and realizing a narrow-frame touch structure.

Specifically, FIG. 7I is a schematic diagram only showing a layout of the converged touch traces in a portion of the lower region of the touch region close to the lower frame region 5 of the touch structure in the embodiment of the present disclosure; FIG. 7J illustrates a cross-sectional view of the touch structure shown in FIG. 7I taken along a line CC'; FIG. 7K illustrates a cross-sectional view of the touch structure shown in FIG. 7I taken along a line DD'.

For example, FIG. 7I is a schematic diagram only showing a layout of a portion of the touch electrodes and the touch traces in the middle of the lower region of the touch structure shown in FIG. 6A. In the lower region, the layout of the touch grid lines 13 constituting the touch electrodes provided on the first surface 200 of the substrate 1 is unchanged. The touch traces 4 in the lower region of the touch structure in this embodiment are arranged to be more densely, compared with the upper region of the touch structure shown in FIG. 7A.

As described above, each first metal grid strip includes two columns of sub-blocks. When the touch traces converge along the second direction Y and extend to the lower region of the touch region, a plurality of columns of sub-blocks are disposed on the first surface 200 of the substrate 1, and two ends of an orthographic projection of each column of sub-blocks on the substrate 1 along the first direction X are respectively provided with the touch traces 4 at corresponding positions on the second surface 300.

That is, as shown in FIGS. 7A and 7J, a distance between every two adjacent touch traces 4 in the upper region of the touch structure (approximately a sum of widths of two columns of sub-blocks) is 2 times of a distance between every two adjacent touch traces 4 in the lower region of the touch structure (approximately the width of one column of sub-blocks). The present disclosure is not limited thereto, for example, the density of the touch traces 13 may be controlled to be compressed according to actual needs. For example, the distance between every two adjacent touch traces 13 in the upper region of the touch structure may be set to be 1.5 to 3 times of the distance between every two adjacent touch traces 13 in the lower region of the touch structure.

Figure 8:
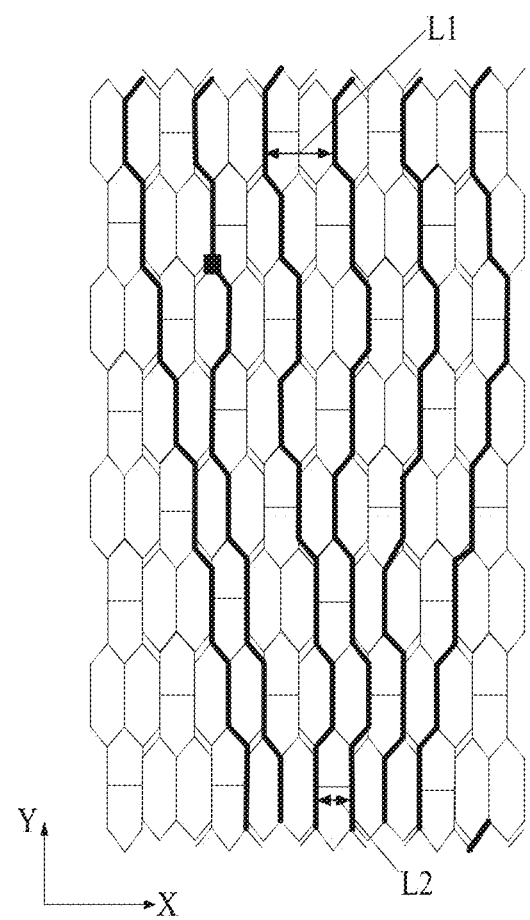
FIG. 8 is a schematic diagram illustrating a comparison between a layout of portions of touch traces away from a lower frame region and a layout of portions of the touch traces close to the lower frame region in a touch structure according to an embodiment of the present disclosure.

Further, FIG. 8 shows that the distance between every two adjacent touch traces before the touch traces in the upper region of the touch region are compressed is approximately 2 times of the distance between every two adjacent touch traces after the touch traces in the lower region are compressed. That is, the touch traces may be converged along the extending direction of the touch grid lines 13 in the manner shown in FIG. 6B, so that the touch traces are arranged more densely close to a central symmetry axis of the touch region when the touch traces are close to the lower frame region.

Figure 9:
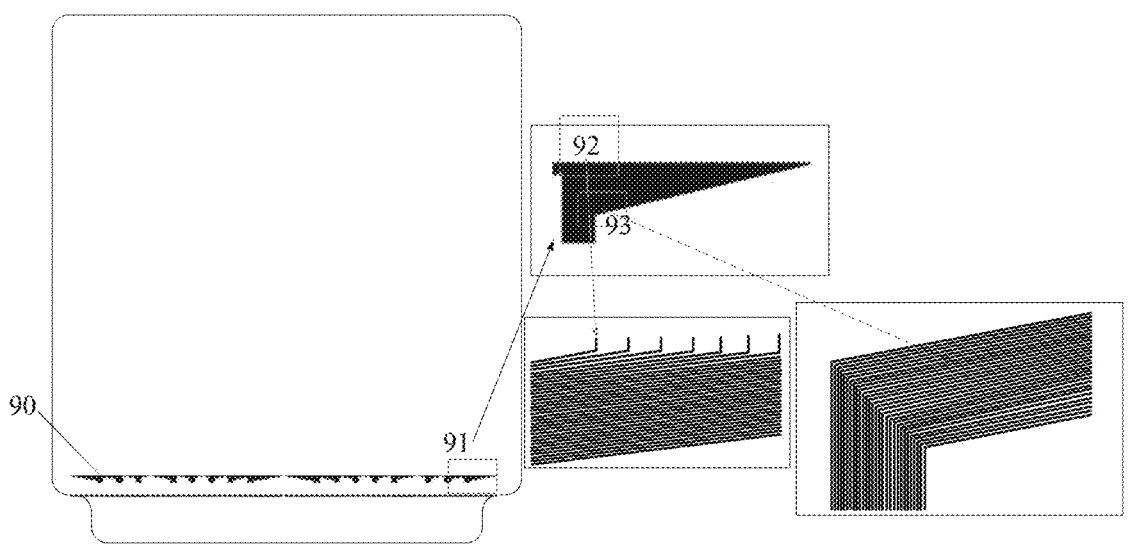
FIG. 9 is a schematic diagram illustrating an electrical connection between touch traces and touch leads in a lower frame region of a self-capacitance touch structure according to an embodiment of the present disclosure.
Figure 10:
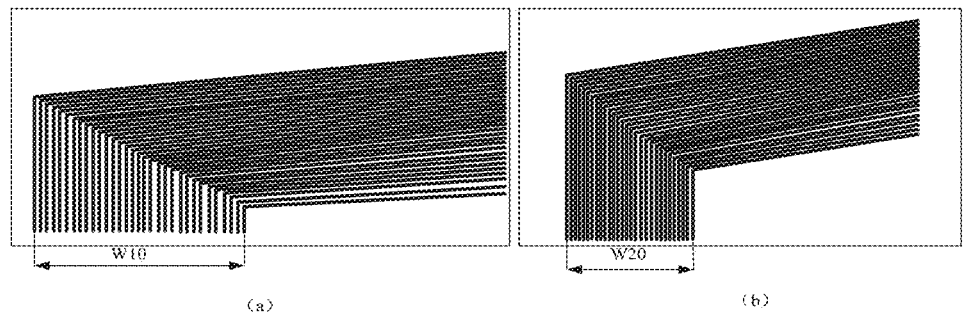
FIG. 10 is a schematic diagram illustrating a layout of touch leads in a lower frame region of a touch structure in the related art and according to an embodiment of the present disclosure.

FIG. 9 shows a layout 90 of touch traces in the lower frame region of the touch structure in which the touch traces are provided in the converging way according to the embodiment of the present disclosure shown in FIG. 8. The touch traces in the generally rounded quadrilateral touch region extend in the direct-type way and then to the interface 92 between the touch region and the lower frame region in the converging way, and the touch traces are further converged in the lower frame region and then led out of the lower frame region. Because the touch traces are distributed in the converging way, the rounded touch traces does not exist at the rounded corners below in the touch region, and the rounded touch traces are converged to the middle region close to the symmetry axis. That is, a partial converging processing is finished in the touch region, so that the edge region is free of touch traces, and the edge region can be compressed by about 2 cm to 3 cm. Further, the size of the sector region for converging the touch leads in the lower frame region 5 may be reduced, and the wire collection region 93 for externally connecting the touch leads may be narrowed. As shown in FIG. 10, in this embodiment, a wire collection width of the lower frame region of the touch structure may be reduced from a first width W10 in the prior art to a second width W20 in the embodiment of the present disclosure, and a difference between the first width W10 and the second width W20 is 656.116 μm.

According to the above embodiments of the present disclosure, the plurality of touch traces corresponding to the plurality of touch electrodes on the touch structure substantially extends over the entire touch region before the plurality of touch traces are converged, i.e. extends over the width of the touch region in the first direction, but the present disclosure is not limited thereto.

Figure 11:
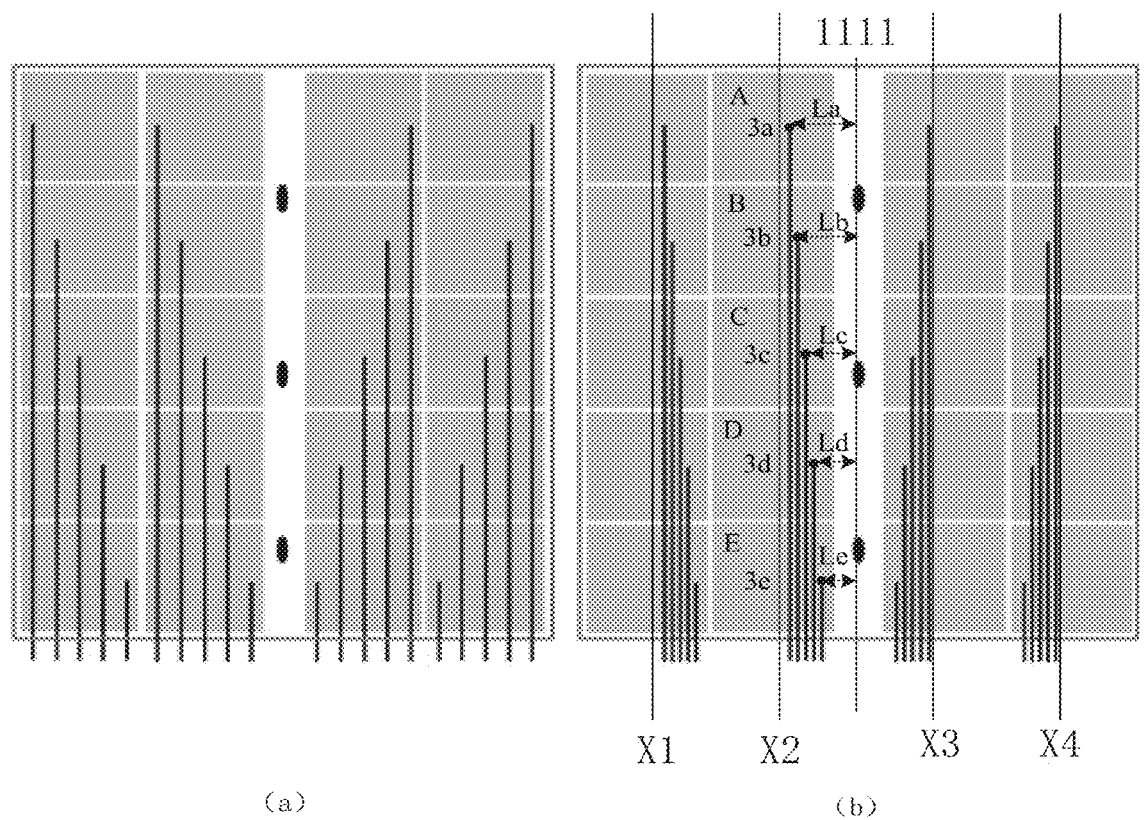
FIG. 11 is a schematic diagram illustrating a layout of touch traces of a touch structure according to an embodiment of the present disclosure.

As shown in FIG. 11, FIG. 11(a) is a schematic diagram showing the layout of the direct-type touch traces of the touch structure in the related art and FIG. 11(b) is a schematic diagram showing the layout of the touch traces of the touch structure according to an embodiment of the present disclosure. The direct-type touch traces of the touch structure in the related art in FIG. 11(a) are uniformly arranged in the width direction (first direction X) of the entire touch region. The touch structure of the present disclosure is shown in FIG. 11(b), and includes a touch region symmetry axis 1111 extending along the second direction Y, and for each row of touch electrodes, the closer the touch electrode is to the lower frame region, the closer the corresponding bridging electrode is to the touch region symmetry axis 1111. As shown in FIG. 11, the touch electrodes in second row are denoted by A, B, C, D, E; the corresponding bridging electrodes are denoted by 3a, 3b, 3c, 3d and 3e, respectively, and the distances of the corresponding bridging electrodes from the touch region symmetry axis 1111 are denoted by La, Lb, Lc, Ld and Le, respectively. As can be seen from FIG. 11, La>Lb>Lc>Ld>Le. Further, each column of touch electrodes has touch electrode symmetry axes X1 to X4 parallel to the touch region symmetry axis 1111, and the bridging electrodes 3 of each column of touch electrodes may be disposed on a side of the touch electrode symmetry axes X1 to X4 thereof close to the touch region symmetry axis 1111. For example, the touch traces may be disposed in a compressed manner on a side of each corresponding column of touch electrodes close to the touch region symmetry axis 1111. In this case, even if the touch traces are still disposed in the direct-type way, the distance between the two outermost touch traces at a position close to the lower frame region is reduced compared to that shown in FIG. 11(a), so that a narrow-frame touch structure may be implemented.

Figure 12:
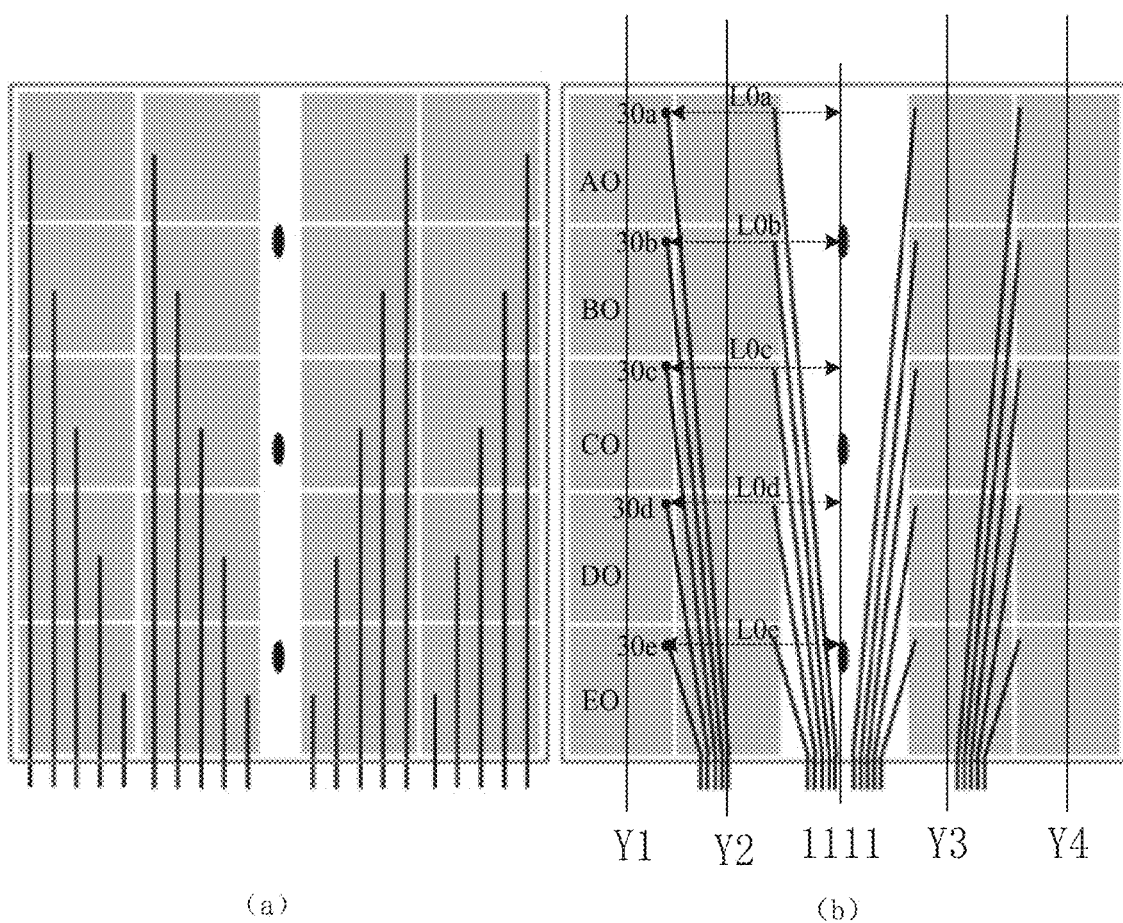
FIG. 12 is a schematic diagram illustrating a layout of touch traces of a touch structure according to an embodiment of the present disclosure.

As shown in FIG. 12, FIG. 12(a) is a schematic diagram showing the layout of the direct-type touch traces of the touch structure in the related art and FIG. 12(b) is a schematic diagram showing the layout of the touch traces of the touch structure according to an embodiment of the present disclosure. The touch structure of the embodiment of the present disclosure is shown in FIG. 12(b), and includes a touch region symmetry axis 1111 extending along the second direction Y, and for each column of touch electrodes, a distance between each bridging electrode 3 and the touch region symmetry axis 1111 is substantially constant. As shown in FIG. 12, the touch electrodes in first column are denoted by AO, BO, CO, DO, EO, the corresponding bridging electrodes are denoted by 30a, 30b, 30c, 30d, and 30e, and the distances of the corresponding bridging electrodes from the touch region symmetry axis 1111 are denoted by L0a, L0b, L0c, L0d, and L0e. As can be seen from FIG. 12, L0a=L0b=L0c=L0d=L0e. Further, each column of touch electrodes has touch electrode symmetry axes Y1 to Y4 parallel to the touch region symmetry axis 1111, and the bridging electrodes 3 of each column of touch electrodes are disposed on a side of the touch electrode symmetry axis Y1 to Y4 of the column of touch electrodes close to the touch region symmetry axis 1111, that is, the bridging electrode 3 of each touch electrode is compressed to a side close to the touch region symmetry axis and extends and converges towards the lower frame region in the touch electrode region of the adjacent column, so that the distance between the two outermost touch traces at a position close to the lower frame region is reduced and a narrow-frame touch structure may be implemented.

Figure 13:
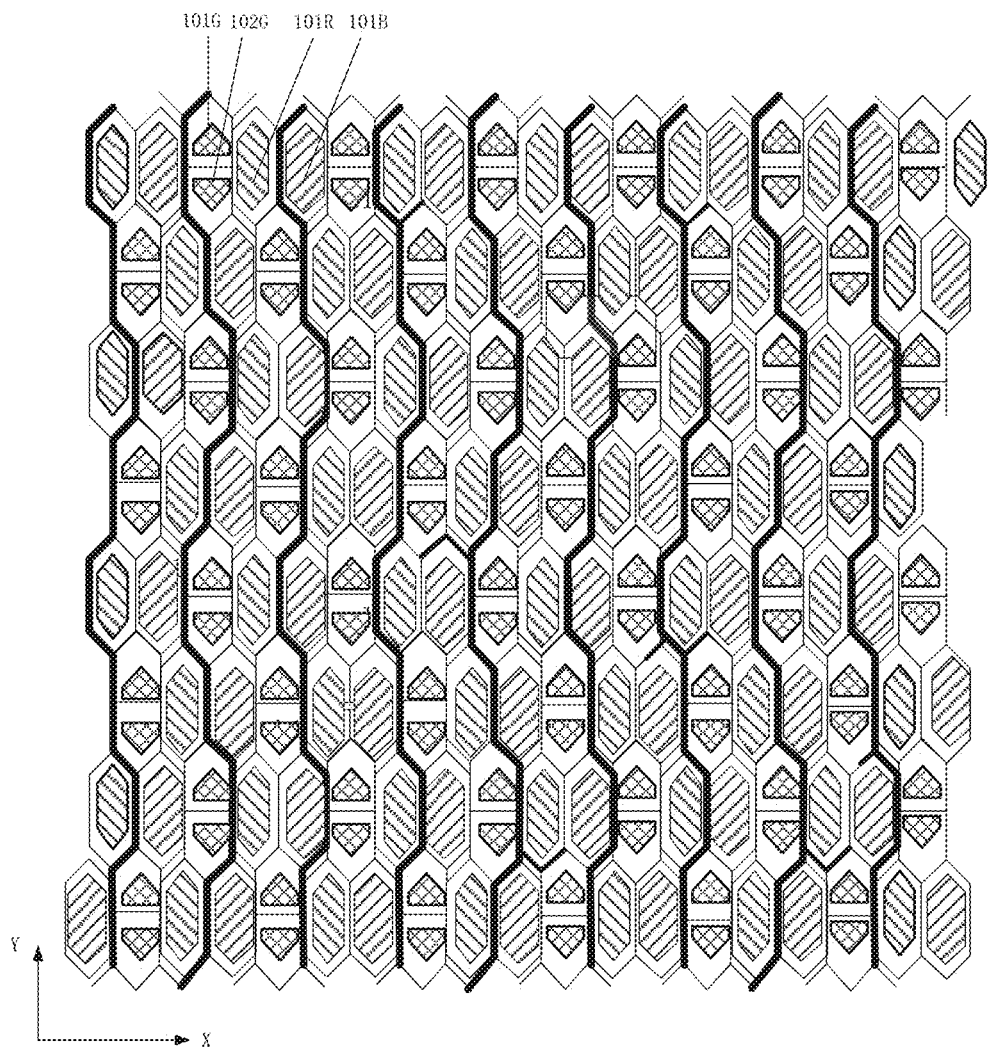
FIG. 13 shows a schematic diagram illustrating a structure of a touch display panel according to an embodiment of the present disclosure.

In other aspect, the present disclosure further provides a touch display panel, for example, for the touch structure as described above; the touch display panel is particularly suitable for a display substrate including an RGGB pixel unit, specifically, as shown in FIG. 13, which is a schematic diagram of the touch display panel including the display substrate and the touch structure. The RGGB pixel unit of the display substrate includes two green sub-pixels 101G, 102G, one red sub-pixel 101R, and one blue sub-pixel 101B. An orthographic projection of the additional metal line 110 of the touch structure on the substrate is positioned between two green sub-pixels of each pixel unit, so that the coverage rate of the touch grid lines can be increased on one hand, and the light emitting regions of the sub-pixels on the display substrate are not shielded on the other hand, so that the display quality of the display substrate is not influenced. In this case, each first sub-block 20 is divided into two parts, a first part and a second part. For example, the divided first and second parts may be symmetrical with respect to the additional metal line 110. An orthographic projection of the first portion on the substrate 1 fully encloses an orthographic projection of one sub-pixel 101G of the two green sub-pixels on the substrate 1, while an orthographic projection of the second portion on the substrate 1 fully encloses an orthographic projection of the other sub-pixel 102G of the two green sub-pixels on the substrate 1, while an orthographic projection of the second sub-block 30 on the substrate 1 fully encloses an orthographic projection of the red sub-pixel 101R on the substrate 1, while an orthographic projection of the third sub-block 40 on the substrate 1 fully encloses an orthographic projection of the blue sub-pixel 101B on the substrate 1. Each sub-pixel may be an organic light emitting diode, a quantum dot light emitting diode, a micro light emitting diode, or the like.

The arrangement of the grid metal lines of the touch structure in the present disclosure is not limited to the shape shown in FIG. 7A. For example, the grid metal lines in the touch structure can be arranged according to the sub-pixel array of the display substrate arranged in the strip and shown in FIGS. 14A and 14B.

Figure 14A:
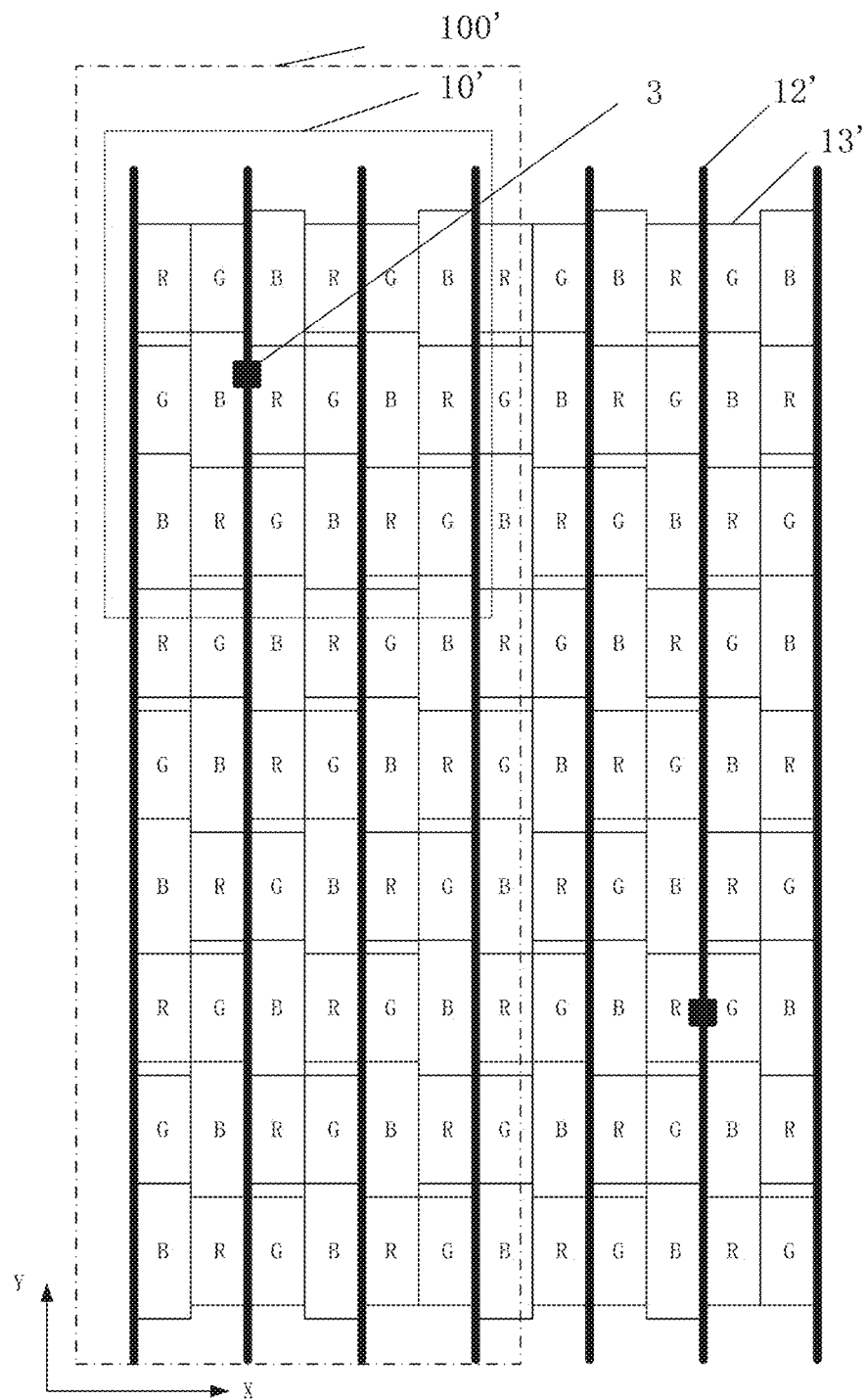
FIGS. 14A and 14B are schematic diagrams illustrating layouts of touch traces before and after compression in touch structures according to embodiments of the present disclosure, respectively.
Figure 14B:
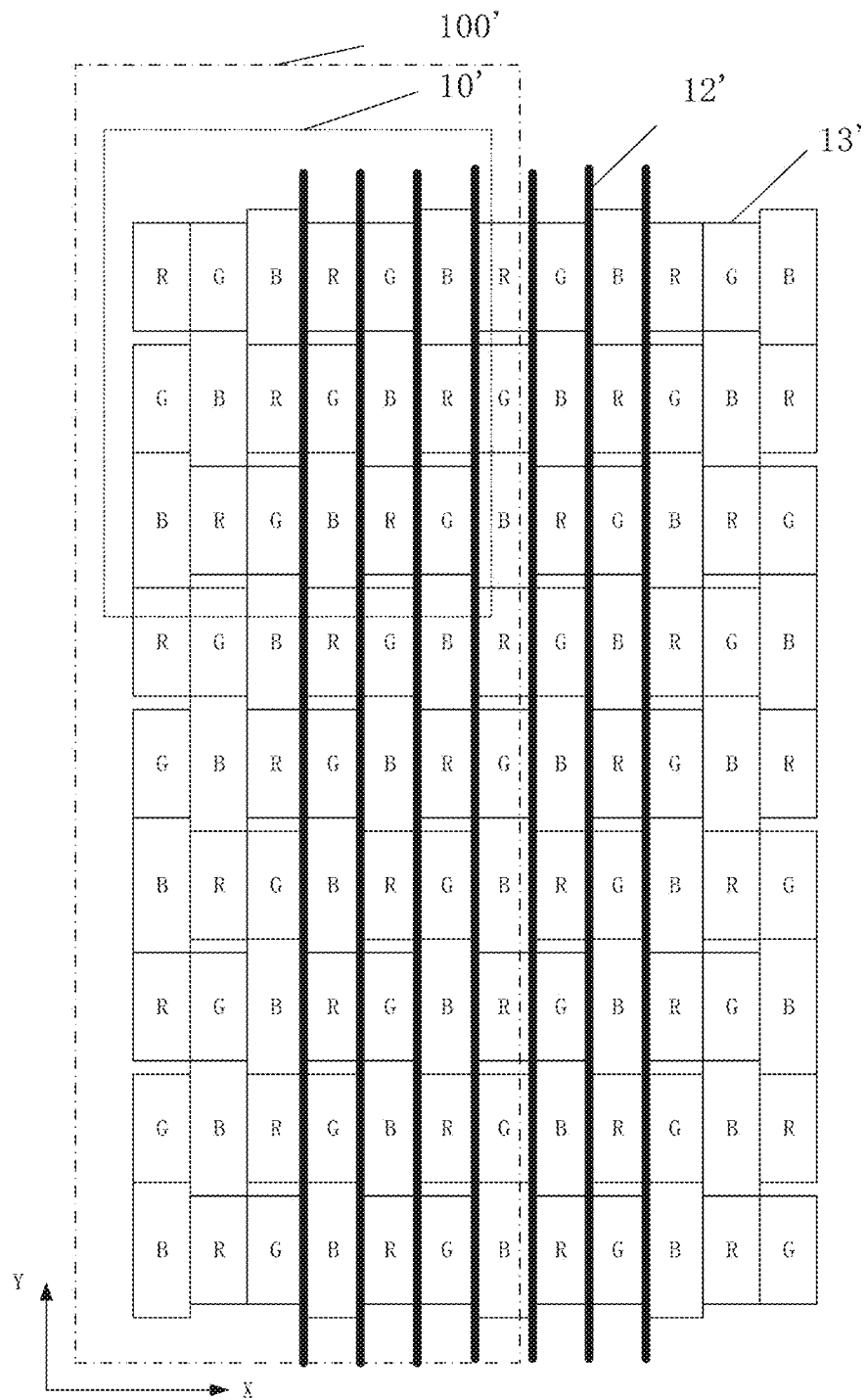

Similar to FIGS. 7A and 7I, FIGS. 14A and 14B are schematic diagrams respectively showing a layout of the touch traces and the touch grid lines of the touch structure in a region away from the lower frame region before compression and in a region close to the lower frame region after compression according to an embodiment of the present disclosure. A difference between the embodiment shown in FIG. 7A and FIG. 7I and the embodiment shown in FIGS. 14A and 14B is that the traces of the touch blocks of the touch structure shown in FIG. 14A and FIG. 14B correspond to the layout of the RGB sub-pixel array of the display substrate, so that orthographic projections of the traces for the touch blocks on the substrate substantially surrounds the periphery of sub-pixels of the sub-pixel array, so as to prevent the traces of the touch blocks from affecting the display of the sub-pixel array in the display substrate, and thus from affecting the aperture ratio of the display substrate. Similar to the metal grids of the touch structure shown in FIG. 7A, as shown in FIG. 14A, an orthographic projection of the first metal grid layer for constructing the plurality of touch electrodes on the substrate also includes a plurality of repeating units 100' sequentially arranged along the first direction X; each repeating unit 100' extends along the second direction Y and includes a plurality of repeating sub-units 10'.

Unlike the touch structure shown in FIG. 7A, based on the layout of the sub-pixel array in the display substrate shown in FIG. 14A, each touch trace of the touch structure may be a straight line extending along the second direction Y, instead of the touch trace 4 shown in FIG. 7A being a folding line extending substantially along the second direction. As shown above, the traces of the touch blocks in the present disclosure are generally provided based on the layout of the sub-pixel array in the display substrate corresponding to the touch blocks, which is not limited in the present disclosure.

In addition, each repeating sub-unit in FIG. 14 has a structure in three rows and three columns, instead of the structure in four rows and three columns shown in FIG. 7A, which also depends on the layout of the sub-pixel array of the display substrate.

In the present disclosure, in order to realize a narrow lower frame region, the touch traces are compressed in the touch region of the touch structure, so that the touch traces approach to the central symmetry axis of the touch region, and the touch traces are converged during extending in the touch region, that is, each of the plurality of touch traces includes a starting point connected to the corresponding touch electrode and an end point connected to the corresponding touch lead, and an orthographic projection of the starting point on the substrate is located in an orthographic projection of the corresponding touch electrode on the substrate and each touch electrode is connected to the starting point of the corresponding touch trace through a corresponding bridging electrode, and a distance between two starting points of every two adjacent touch traces in the row direction is larger than a distance between two end points of the two touch traces in the row direction. With the above arrangement for the touch traces, the touch traces have been already converged when extending to the edge of the lower frame region, so that the distance between the two outermost touch traces is narrowed, and a narrow lower frame region is realized.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A touch structure, comprising a substrate, wherein the touch structure is divided into a touch region and a lower frame region connected to the touch region; the touch structure further comprises:
   a touch electrode array and a plurality of touch traces in the touch region, wherein the touch electrode array is on the substrate and comprises a plurality of touch electrodes arranged in a plurality of rows and a plurality of columns, and the plurality of touch traces are electrically connected to the plurality of touch electrodes, respectively; and
   a plurality of touch leads in the lower frame region, wherein the plurality of touch leads are electrically connected to the touch traces, respectively; and
   wherein orthographic projections of every two adjacent touch traces of the plurality of touch traces on the substrate do not overlap with each other, a distance between the orthographic projections of the two adjacent touch traces on the substrate at a first position is larger than or equal to a distance between the orthographic projections of the two adjacent touch traces on the substrate at a second position; wherein the first position is farther away from the lower frame region than the second position; each touch trace of the plurality of touch traces comprises a starting point on a side of the touch region away from the lower frame region and an end point on a side of the touch region close to the lower frame region and connected to a corresponding touch lead, and a distance between two starting points of every two adjacent touch traces in a first direction is larger than a distance between two end points of the two touch traces in the first direction, wherein the touch electrode array comprises a first metal grid layer comprising a plurality of grid blocks serving as the plurality of touch electrodes and electrically insulated from each other, the first metal grid layer comprises a plurality of first metal grid sub-strips, a plurality of second metal grid sub-strips and a plurality of third metal grid sub-strips so as to form a plurality of repeating units, each of which comprises one first metal grid sub-strip, one second metal grid sub-strip and one third metal grid sub-strip arranged along the first direction; and each of the plurality of repeating units comprises a plurality of repeating sub-units arranged along a second direction.

2. The touch structure of claim 1, wherein an orthographic projection of each of the plurality of touch traces on the substrate is a folding line.

3. The touch structure of claim 2, wherein each of the plurality of touch electrodes is a grid electrode block comprising a plurality of metal grids, and at least a portion of an orthographic projection of each of the plurality of touch traces on the substrate overlaps with orthographic projections of metal grids of the grid electrode blocks of the plurality of touch electrodes on the substrate.

4. The touch structure of claim 3, wherein a material of each of the plurality of touch traces and the plurality of touch electrodes is a metal material.

5. The touch structure of claim 1, wherein an orthographic projection of each of the plurality of touch traces on the substrate is a straight line, and a material of the touch trace is a transparent conductive material.

6. The touch structure of claim 1, wherein a distance between orthographic projections of starting points of every two adjacent touch traces on the substrate is 1.5 to 3 times of a distance between orthographic projections of end points of the two adjacent touch traces on the substrate.

7. The touch structure of claim 1, wherein each of the plurality of repeating sub-units comprises four rows of blocks, wherein a first row of blocks comprises a first block, a second block and a third block sequentially arranged along the first direction, each row of a second row of blocks and a fourth row of blocks comprises a second block, a third block and a first block sequentially arranged along the first direction, and a third row of blocks comprises a third block, a first block and a second block sequentially arranged along the first direction; and the first block comprises a first sub-block and a second sub-block arranged along the first direction and in contact with each other, the second block comprises a third sub-block and a first sub-block arranged along the first direction and in contact with each other, and the third block comprises a second sub-block and a third sub-block arranged along the first direction and in contact with each other.

8. The touch structure of claim 7, wherein each of the first sub-block, the second sub-block and the third sub-block is a hexagonal sub-block extending along the second direction;

a length of the first sub-block along the second direction is greater than that of each of the second sub-block and the third sub-block along the second direction; and the first blocks and the second blocks in two adjacent rows are arranged to be staggered in the first direction by a predetermined distance, so that the third sub-block in each second block is between the first and second sub-blocks in the corresponding first block in the first direction; the second blocks and the third blocks in two adjacent rows are arranged to be staggered in the first direction by a predetermined distance, so that the second sub-block in each second block is between the third and first sub-blocks in the corresponding third block in the first direction; and the first blocks and the third blocks in two adjacent rows are arranged to be staggered in the first direction by a predetermined distance, so that the second sub-block in each third block is between the first and second sub-blocks in the corresponding first block in the first direction.

9. The touch structure of claim 8, wherein the plurality of touch traces and the first metal grid layer are in different layers; and an orthographic projection of each of the starting points of the plurality of touch traces on the first metal grid layer is between two of the first metal grid sub-strip, the second metal grid sub-strip and the third metal grid sub-strip.

10. The touch structure of claim 9, wherein orthographic projections of the end points of the plurality of touch traces of the plurality of grid blocks of the plurality of touch electrodes on the substrate are between two adjacent first and second sub-blocks, between two adjacent second and third sub-blocks, and between two adjacent third and first sub-blocks, respectively.

11. The touch structure of claim 10, wherein the plurality of touch traces and the first metal grid layer are on a first surface and a second surface of the substrate, respectively, and the plurality of touch electrodes comprise a plurality of bridging electrodes, respectively, and the bridging electrode of each touch electrode penetrates through a via hole in the substrate to be electrically connected to the corresponding touch trace.

12. A touch display panel, comprising a display substrate and the touch structure of claim 8, wherein the display substrate comprises a plurality of pixel units, wherein each pixel unit comprises a first sub-pixel, a second sub-pixel and a third sub-pixel; and an orthographic projection of the first sub-block on the substrate surrounds an orthographic projection of the first sub-pixel on the substrate, an orthographic projection of the second sub-block on the substrate surrounds an orthographic projection of the second sub-pixel on the substrate, and an orthographic projection of the third sub-block on the substrate surrounds an orthographic projection of the third sub-pixel on the substrate.

13. The touch structure of claim 1, wherein each of the plurality of repeating sub-units comprises three rows of blocks, wherein a first row of blocks comprises a first block, a second block and a third block sequentially arranged along the first direction, a second row of blocks comprises a second block, a third block and a first block sequentially arranged along the first direction, and a third row of blocks comprises a third block, a first block and a second block sequentially arranged along the first direction; and the first block comprises a first sub-block and a second sub-block which are arranged along the first direction and are in contact with each other, the second block comprises a third sub-block and a first sub-block which are arranged along the first direction and are in contact with each other, and the third block comprises a second sub-block and a third sub-block which are arranged along the first direction and are in contact with each other.

14. The touch structure of claim 13, wherein each of the first, second and third sub-blocks is a rectangular sub-block extending along the second direction;

a length of the first sub-block along the second direction is greater than that of each of the second sub-block and the third sub-block along the second direction; and the first blocks and the second blocks in two adjacent rows are aligned with each other in the first direction, the second blocks and the third blocks in two adjacent rows are aligned with each other in the first direction; and the first blocks and the third blocks in two adjacent rows are aligned with each other in the first direction.

15. The touch structure of claim 1, wherein the touch region comprises a touch region symmetry axis extending along a second direction, and the plurality of touch electrodes in the touch region are symmetrically distributed with respect to the touch region symmetry axis;

the plurality of touch electrodes comprise a plurality of bridging electrodes, respectively, and the bridging electrode of each touch electrode is electrically connected to the corresponding touch trace; and for each column of touch electrodes, as the touch electrode is closer to the lower frame region in the second direction, the bridging electrode of the touch electrode is farther from the touch region symmetry axis in the first direction.

16. The touch structure of claim 1, wherein the touch region comprises a touch region symmetry axis extending along a second direction, and the plurality of touch electrodes in the touch region are symmetrically distributed with respect to the touch region symmetry axis;

the plurality of touch electrodes comprise a plurality of bridging electrodes, respectively, and the bridging electrode of each touch electrode is electrically connected to the corresponding touch trace; and a distance between each bridging electrode of each column of touch electrodes and the touch region symmetry axis in the first direction is substantially constant.

17. The touch structure of claim 16, wherein each column of touch electrodes comprise a touch electrode symmetry axis parallel to the touch region symmetry axis, and the bridging electrodes of the column of touch electrodes are arranged on a same side of the touch electrode symmetry axis close to the touch region symmetry axis.

18. The touch structure of claim 1, wherein the touch region comprises a touch region symmetry axis extending along a second direction, and for each column of touch electrodes, as the touch electrode is closer to the lower frame region in the second direction, the bridging electrode of the touch electrode is closer to the touch region symmetry axis in the first direction.

19. The touch structure of claim 18, wherein each column of touch electrodes comprise a touch electrode symmetry axis parallel to the touch region symmetry axis, and the bridging electrodes of the column of touch electrodes are arranged on a same side of the touch electrode symmetry axis close to the touch region symmetry axis.

\* \* \* \* \*